United States Patent
Kent et al.

(10) Patent No.: US 10,554,813 B2
(45) Date of Patent: *Feb. 4, 2020

(54) SYSTEMS AND METHODS FOR AUTOMATICALLY CONDUCTING RISK ASSESSMENTS FOR TELEPHONY COMMUNICATIONS

(71) Applicant: Transaction Network Services, Inc., Reston, VA (US)

(72) Inventors: Sean J. Kent, Washington, DC (US); Ken Cartwright, Berryville, VA (US); Amit Singla, Seattle, WA (US); Srikanth Mohan, Reston, VA (US); Paul Florack, Leawood, KS (US)

(73) Assignee: Transaction Network Services, Inc., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/369,282

(22) Filed: Mar. 29, 2019

(65) Prior Publication Data

US 2019/0230223 A1 Jul. 25, 2019

Related U.S. Application Data

(63) Continuation of application No. 15/801,019, filed on Nov. 1, 2017, now Pat. No. 10,284,720.
(Continued)

(51) Int. Cl.
*H04Q 3/00* (2006.01)
*H04M 3/436* (2006.01)
*G06N 99/00* (2019.01)
*H04M 3/42* (2006.01)
*G06N 20/00* (2019.01)

(52) U.S. Cl.
CPC ............ *H04M 3/436* (2013.01); *G06N 20/00* (2019.01); *H04M 3/42042* (2013.01); *H04Q 3/0029* (2013.01); *H04Q 3/0083* (2013.01); *H04M 2203/551* (2013.01); *H04M 2203/6027* (2013.01); *H04Q 2213/13139* (2013.01); *H04Q 2213/13345* (2013.01)

(58) Field of Classification Search
CPC H04M 3/436; H04M 3/42042; H04Q 3/0029; H04Q 2213/13345; G06N 99/005
USPC .............. 379/221.09, 221.05, 207.15, 266.1, 379/211.01, 221.08
See application file for complete search history.

(56) References Cited

U.S. PATENT DOCUMENTS

| | | |
|---|---|---|
| 7,096,498 B2 | 8/2006 | Judge |
| 7,694,128 B2 | 4/2010 | Judge et al. |

(Continued)

*Primary Examiner* — Thjuan K Addy
(74) *Attorney, Agent, or Firm* — Christensen O'Connor Johnson Kindness PLLC

(57) ABSTRACT

Systems and methods for using machine-learning techniques for labeling incoming calls with categories relating to a risk level. A model is generated using call log data. The call log data is augmented using information from additional data sources to generate features for the model. The model may then be used to categorize additional incoming calls. The model may be used in real-time to categorize incoming calls, or categorization results may be stored for a plurality of calling numbers. Various embodiments provide various technical advantages by virtue of how the components of the system are deployed between an endpoint communication device, a telephony provider system, and possibly other systems.

14 Claims, 14 Drawing Sheets

| | COMPLIANT ROBOCALLER | NON-COMPLIANT ROBOCALLER | SPAMMER | SPOOFER | SCAMMER |
|---|---|---|---|---|---|
| RISK LEVEL: | NEGLIGIBLE | MINOR | MODERATE | MAJOR | CATASTROPHIC |
| LIKELIHOOD: | | | | | |
| ALMOST CERTAIN (>50%) | +4 | -2 | -3 | -4 | -4 |
| LIKELY (21%-50%) | +3 | -2 | -2 | -3 | -4 |
| POSSIBLE (6%-20%) | +2 | -1 | -2 | -3 | -3 |
| UNLIKELY (1%-5%) | +1 | -1 | -1 | -2 | -3 |
| RARE (<1%) | +1 | -1 | -1 | -2 | -3 |

Related U.S. Application Data

(60) Provisional application No. 62/415,982, filed on Nov. 1, 2016.

(56) References Cited

U.S. PATENT DOCUMENTS

| | | |
|---|---|---|
| 9,002,334 B2 | 4/2015 | Gosselin et al. |
| 2007/0087756 A1* | 4/2007 | Hoffberg ............ G06Q 10/0631 455/450 |

* cited by examiner

| RISK LEVEL: | COMPLIANT ROBOCALLER | NON-COMPLIANT ROBOCALLER | SPAMMER | SPOOFER | SCAMMER |
|---|---|---|---|---|---|
| LIKELIHOOD: | NEGLIGIBLE | MINOR | MODERATE | MAJOR | CATASTROPHIC |
| ALMOST CERTAIN (>50%) | +4 | -2 | -3 | -4 | -4 |
| LIKELY (21%-50%) | +3 | -2 | -2 | -3 | -4 |
| POSSIBLE (6%-20%) | +2 | -1 | -2 | -3 | -3 |
| UNLIKELY (1%-5%) | +1 | -1 | -1 | -2 | -3 |
| RARE (<1%) | +1 | -1 | -1 | -2 | -3 |

*FIG. 1*

SYSTEMS AND METHODS FOR AUTOMATICALLY CONDUCTING RISK ASSESSMENTS FOR TELEPHONY COMMUNICATIONS

CROSS-REFERENCE TO RELATED APPLICATION

This application is a continuation of U.S. patent application Ser. No. 15/801,019, filed Nov. 1, 2017, which claims the benefit of Provisional Application No. 62/415,982, filed Nov. 1, 2016, the entire disclosures of which are hereby incorporated by reference for all purposes.

BACKGROUND

The prevalence of nuisance calls and fraudulent calls on the telephone networks has reached an alarming level. Attempts have been made to regulate end-user telecommunication activity. For example, the Telephone Consumer Protection Act (TCPA) was passed by Congress in 1991 to regulate the use of auto-dialers and prerecorded messages. The specifics of the regulation and the courts' interpretation are complex and sometimes difficult to decipher, but the essence of the law is to safeguard consumer privacy by mandating that robocallers obtain consumer consent before placing any 'non-emergency' robocall towards the consumer's cell phone. The Truth in Caller ID Act was passed by Congress in 2007. It prohibits any person or entity from knowingly transmitting misleading or inaccurate Caller ID information with the intent to defraud, cause harm, or wrongly obtain anything of value. If no harm is intended or caused, spoofing is not illegal. For instance, it is not illegal for websites to allow consumers to place calls with spoofed caller-id numbers. The Fair Debt Collection Practices Act (FDCPA) was passed by Congress in 1977 to eliminate abusive debt collection practices by debt collectors. It prohibits debt-collectors from calling before 8 a.m. or after 9 p.m., calling a consumer's place of employment, or using deceptive caller id practices. Furthermore, collections agencies are required to make meaningful disclosure of their identity when calling a debtor.

Unfortunately, in practice these laws have proven to be virtually unenforceable. For example, telephony carriers are unable to put in place effective enforcement measures to enforce the rules and regulations implementing the Truth in Caller ID Act and the Telephone Consumer Protection Act (TCPA) because the carriers lack insight to caller intent and legitimacy. To prevent activities prohibited by these laws, carriers would be required to collect prohibitive quantities of personal, privacy-protected information not germane to the carrier's provisioning telecommunications services. At the same time, landline and mobile subscribers are plagued by unsolicited calls, calling scams, phishing and identity theft, automated robocallers, and other forms of unwanted communication.

A level of trust in a caller's identity should be determined to enable the carrier and subscriber to discern illegal calls from legitimate calls, and solicited calls from unwanted nuisance calls. Efforts to do this, however, are thwarted by abuse of the technologies available by unscrupulous callers. For example, to avoid detection and perpetrate their illicit calling schemes, bad actors often hide their identity by withholding identifying information, pretending to be another entity (as in spoofing another telephone number), or outright impersonating another party (as in phishing scams). Many low cost Internet phone services allow end-users to customize the caller-id-name displayed to other end-users. Accordingly, caller-id-name alone does not provide reliable information for accurately identifying a caller. One example of this is that scammers impersonating bank personnel will often customize their caller-id-name to display "Card Services," "Customer Svc," or similar. There are many other reported examples highlighting the various types of abuse by bad actors engaged in telephony abuse and unwanted commercial or illegal solicitation.

Accordingly, there is a need for a way of assigning a level of trustworthiness to incoming calls in a telephony system. Due to the nature of telephony and the large number of incoming calls that would need to be processed from previously unseen callers, technical problems arise in being able to assign trustworthiness levels in a manner that is accurate, fast enough to deal with telephony-scale traffic, and capable of adapting to new tactics on the part of unscrupulous callers.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a distributed system for automatically conducting risk assessments for telephony communications is provided. The system comprises a telephony provider system, a risk assessment system, and an endpoint communication device. The telephony provider system includes a service control point. The risk assessment system includes a machine learning engine configured to generate a model for assessing risk of incoming calls based on a set of call log records, and a risk processing engine configured to process incoming call page information using the model. The endpoint communication device includes a call handler engine. The distributed system is configured to conduct a risk assessment for an incoming call received by the telephony provider system and directed to the endpoint communication device, by receiving, by the risk processing engine, information representing the incoming call, wherein the information representing the incoming call includes a caller phone number; processing, by the risk processing engine, the information representing the incoming call using the model to generate a category and a likelihood value; receiving, by the call handler engine of the endpoint communication device from the telephony provider system, a call page associated with the incoming call, the category, and the likelihood value; and processing, by the call handler engine, the call page using the category and the likelihood value.

In some embodiments, a method of automatically conducting risk assessments for telephony communications is provided. A risk assessment system generates a model for assessing risk of incoming calls based on a set of call log records. The risk assessment system stores, in a classified number data store, category and likelihood values for a plurality of caller numbers, wherein the category and likelihood values are generated using the model. A call handler engine of an endpoint communication device receives a caller number of an incoming call. The call handler engine retrieves a category and likelihood value for the caller number from the classified number data store. The call handler engine presents at least one of the category and the likelihood value to a user.

In some embodiments, a non-transitory computer-readable medium having computer-executable instructions stored thereon is provided. The instructions, in response to execution by one or more processors of a risk assessment system, cause the risk assessment system to perform actions for automatically conducting risk assessments for telephony communications, the actions comprising generating, by the risk assessment system, a model for assessing risk of incoming calls based on a set of call log records; receiving, by the risk assessment system, information representing an incoming call directed to an endpoint communication device via a telephony provider system; processing, by the risk assessment system, the information representing the incoming call using the model to determine a category and a likelihood value for the incoming call; and providing the category and the likelihood value to the telephony provider system for transmission to the endpoint communication device.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 1 illustrates an example risk rating matrix relevant to various embodiments of the present disclosure;

DETAILED DESCRIPTION

Figure 2:
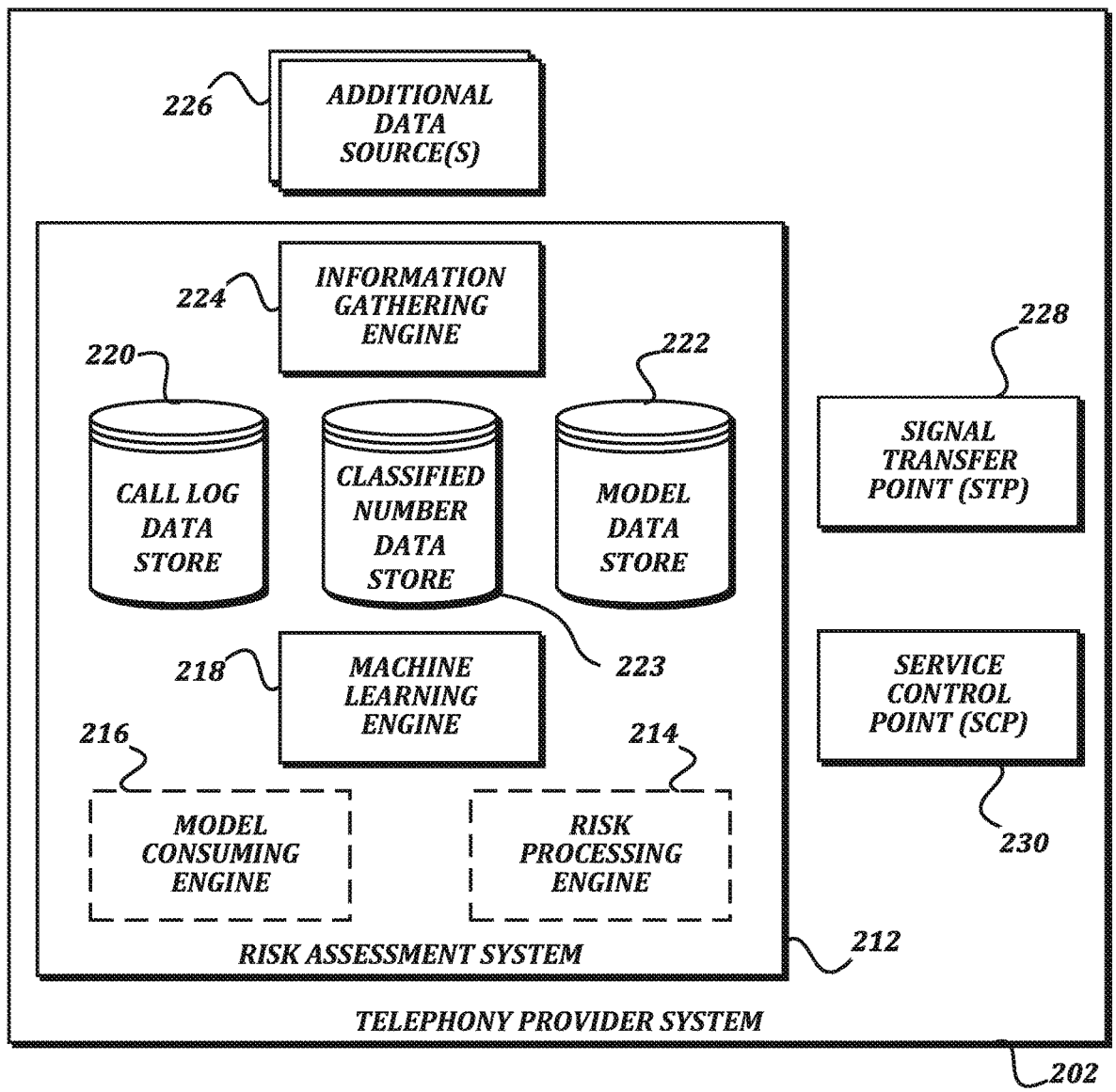
FIG. 2 is a block diagram that illustrates an example embodiment of a telephony provider system and an endpoint communication device configured for conducting automatic risk assessments of incoming calls according to various aspects of the present disclosure.

The range of situations that would benefit from an automated telephony caller reputation analysis service is quite broad. Here are some examples highlighting various forms of telephony system abuse, and end users that would benefit from an improved reputation analysis service:

(1) A mobile app developer building an anti-spam app may use the service to provide insights that help identify callers who are violating state and federal laws governing the use of auto-dialers, most notably those whose intent is to perpetrate a crime of identity theft or fraud.

(2) A fraud investigator at a bank, whose customers fall victim to phishing attacks, may use the service to inhibit a scammer's ability to deceive bank customers with caller-id spoofing.

(3) A senior compliance officer for a business that places automated calls to its customers may use the service to provide phone data insights required to identify when consent to auto-dial is required and when a customer's prior consent is no longer valid.

(4) A fraud analyst responsible for manually reviewing orders for an online ecommerce website may use the service to provide insight to the reputation of a telephone number, and qualify it before actually trusting the number and calling to confirm the legitimacy of an order.

(5) A credit risk manager for a commercial bank, whose responsibilities include monitoring the risk of delinquency by borrowers, may use the service to provide a warning whenever borrowers disconnect their telephone service—their primary means of contacting borrowers.

(6) A frontline supervisor for a bank's outbound call center, finding it difficult to get people to trust the bank call center's caller id, may use the service to provide a simple (low cost) technique for gaining customer's trust for incoming calls—a sort of trusted caller accreditation.

Of course, the above examples are not limiting, and other uses exist for embodiments of the present disclosure.

While identity is readily spoofed or faked, it is much harder to fake a reputation. Reputation may be based on calling history—a calling party or end-user's past calling behavior, patterns, or recorded opinions of other parties. Such reputation information can provide valuable context to other end-users. This is a much richer model of identity than just a display name or calling number.

Despite the value of this information, reputation derived from individual subscribers and crowd-sourced data from large numbers of subscribers is inherently difficult to verify as accurate. Before call pickup, there is no reliable way for a called party to qualify an incoming number as accurate, truly representing the identity of the calling party, or spoofed by a spammer. For example, individual callers, whether for their own contact information, or for contribution to crowd-source data sets, will often be confused in characterizing between human operators from call centers using autodial technology and response scripts, voice-driven automated customer service interactions, and purely robocaller voice systems. Often, once pickup occurs, the harm has been done: the called party is interrupted, and they must make judgments on the nature of the call without experience or insight. For that reason, subscribers may also, typically, treat all the above types of incoming calls as unwanted telephone solicitation or spam calls, without distinction.

For at least these reasons, an alternative solution—a well-defined carrier-based reputation analysis system—is desired. Such a system may allow end-users to anonymously share opinions about other calling end-users in order to collect information relevant to reputation analysis. The integration of this reputation system directly into the carrier network neatly solves the trust problem by allowing call screening based on historical call data and call pattern analysis, and for subscribers (called parties) to submit feedback. Such integration may also increase the chance that the reputation information (or an analysis thereof that determines a caller's trustworthiness) can be provided to the end user before pickup occurs.

A solution to these (and other) problems is to engage in the automated qualification of calling party telephone numbers and the characterization of callers based on call pattern data and associated analytics, the combination of which determines reputation scores and objective caller characterization. This approach has the advantage of eliminating a host of subjectivity inherent in individual caller reporting and larger scale crowd-sourced data.

Some embodiments of the present disclosure provide a calling party telephone number reputation service. The service is a rating service, not to be confused with a black list service, in that while it may automatically block some calls from particularly untrustworthy callers, it may simply provide reputation information for other callers to allow the end user to decide how the call should be handled. The service functions by collecting data from multiple sources and using the data to create accurate, comprehensive reputation profiles that the service then boils down to a single reputation score, indicating the trustworthiness of a given caller. Additionally, in some embodiments, the service employs a machine learning method to classify caller activity, categorizing solicited, unsolicited and potentially illegal caller activity. By way of example: the service may assign a caller category of "scammer" whenever the service deems a caller to be likely to be involved an illegal phone calling scam; and may assign a caller category of "trusted" when the service deems the call to be from a known, trusted party engaged in expected/normal calling behavior.

The system and methods presented here are effective operating on their own using data available within a telephony provider system, or in tandem with other sources of reputation data. Some embodiments of the systems described herein provide objective, first—time call screening which provides both reputation and caller characterization to the network and the call receiving party. Some embodiments of the systems described herein can automatically check and verify the accuracy of other sources of reputation data based solely on characteristics of the incoming call such as the calling party number.

One example benefit of the described solution is its generality. The technology described herein provides benefits to good commercial (calling) actors and the called parties in tandem. While consumer apps designed to protect end-users from scammers and spammers form a major application area for telephony reputation services, various other disciplines and application areas benefit from this significant trend in decision support for telephony mediated service provision. For example, banks may reach their subscribers directly, with a reputation indicator allowing the receiving subscriber to trust the call, without invoking fear that the incoming call is a phishing scam or spoof of the bank call center and thus increasing the security of communication between banks and their subscribers.

In some embodiments of the present disclosure, a telephony reputation service is provided that facilitates trust. In general, reputation of a party may be considered a sign of trustworthiness as determined by other parties. In the context of telecommunications services, reputation may represent the opinions end-users report about another end-user of telecommunications services. Whenever end-users ("callees" or "called parties," typically called party subscribers to a mobile or landline telephony carrier or VoIP network) receive calls from another end-user ("caller"), they may be given an opportunity to share their opinion about the caller's intent and legitimacy. Reputation scores may then be computed and made available based on the collection of opinions callees hold about that caller along with other data about the caller's activity. These reputation scores may then also be used to generate models that can predict a reputation score for new callers that have not been seen before.

When a reputation score is complex, as with the factors that are useful for predicting an end-user's telephony reputation, the reputation score or its components may not be suitable for public display as a standalone score, which other end-users rely upon in specific, context-sensitive decisions. Accordingly, some embodiment of the present disclosure may use a 'risk matrix' (see FIG. 1) as a practical and easy-to-use tool to present a complex reputation score in a concise fashion.

Two issues to be addressed for successfully using a risk matrix are a clearly defined risk statement and robust consequence definitions. As such, the risk statement described below is formulated in terms of key provisions of consumer privacy laws that are germane to the telecommunications problem domain. The types of consequences to be safeguarded against may be identified by means of a risk impact assessment: situation, event and impact in the likelihood of the risk eventuating. As a policy, this considers risk to be a failure to safeguard a user of telecommunications services ('end-user') from fraudulent, abusive, or unlawful use of, or subscription to, such services by an opportunistic criminal element resulting in the victimization of an end-user.

Implementing this policy may use a decision making method and data analysis, which may be created using machine learning. This approach to resolving vagueness and ambiguity in end-user opinions includes rating the likelihood the target belongs to each of two strong, but conflicting categories. By examining the absolute difference between these ratings, it is possible to determine the extent to which end users are selecting both alternatives to an equal degree (resulting in a relatively small difference) or elevating one alternative and eliminating the other (resulting in a relatively large difference).

In terms of machine learning and categorization, end-user opinions used to train the models as described herein may defy clear categorization. This uncertainty may arise from weak evidence (vagueness) versus generally strong, conflicting evidence (ambiguity) in the sentiment of end-user opinions. Vague uncertainty exists when there is a general lack of information regarding a judgment of intent and legitimacy. In terms of categorization, an example of a vague end-user opinion would be one where there is only weak evidence for membership to any specific category. For example, without ever actually answering a call to confirm their bias generalization, an end-user may judge the intention of an unknown caller to be telemarketing-related. Whereas experience shows those end-users who leave a comment concerning the content of a recorded voice message, interaction with the caller, or results of a callback leave opinions leading to a much higher quality of categorization. Ambiguous uncertainty exists when there is an abundance of conflicting information regarding a possible judgment. In terms of categorization, an example of ambiguous end-user opinions would be where there is strong evidence for membership in two or more mutually exclusive categories. Because each alternative category has strong evidence to support it, it's not difficult to accept any one of them; each alternative by itself could provide a clear answer. For example, consider the situation where a scammer is spoofing a financial institution's legitimate 1-800 number, playing a deceitful recording to any consumer who answers. In these situations it's not uncommon for different end-users to leave ambiguous opinions categorizing calls that are indicated as being from the given 1-800 number as being either telemarketing-related, legitimate customer service call (e.g. fraud alert) related, or scammer (fraudulent bank alert) all at the same time.

Six example risk impact assessment categories are (1) scammer, (2) spoofer, (3) spammer, (4) non-compliant robocaller, (5) compliant robocaller, and (6) norm-compliant. In some embodiments, different terminology may be used, and more or fewer categories may be provided.

A "scammer" is typically a person or entity using an auto-dialer in the commission of a crime of identity theft or fraud, possibly in reckless disregard of state and federal laws governing the use of auto-dialers. A typical behavior pattern includes a deceitful, prerecorded voice message being played persuading the end-user to stay on the line (or to call another number) to unwittingly provide the caller with private personal and financial information. Identifications of scammers may include incidents of caller-id-spoofing by scammers based on testimony of end-users who actually reported answering the scammer's call and reported the essence of subsequent interaction to be of a phone calling scam nature. It is not based purely on speculation that all spoofers are scammers. In general, the severity of risk of scammer calls is catastrophic, in that the loss of money, time, and emotional impact may be similar to being the victim of a violent crime.

A "spoofer" is typically a person or entity who is knowingly and willfully causing transmission of misleading or inaccurate caller ID information, possibly with intent to conceal a violation of the Telephone Consumer Protection Act, Fair Debt Collection Practices Act, or other consumer privacy or telecommunication laws. A typical behavior pattern includes an auto-dialer transferring the end-user to a live person, but the intent of caller is discovered to not be criminal in nature (as with the "scammer" category). Another typical behavior pattern is that a caller of unknown intent abandons the call without leaving a voice mail, and an end-user callback to the number reveals that the return number associated with the displayed caller ID information is disconnected. In general, the severity of risk of spoofer calls is major, as invasion of privacy can cause emotional distress, particularly in the case of repeated, harassing calls where the caller ID information doesn't support a private right of action.

A "spammer" is typically a person or entity placing automated calls, both telemarketing and information in nature, without prior consent. This may be in willful non-compliance with the Telephone Consumer Protection Act. A typical behavior pattern is that the caller repeatedly calls, and when the end user does not answer, calls are abandoned without leaving a voice mail. Another typical behavior pattern is that, upon an end user returning the call, a recorded message is played with instructions to press buttons to be taken off the call list. In general, the severity of risk of spammer calls is moderate, because the caller ID information will be legitimate, and therefore supports a private right of action for violations and statutory damages.

A "non-compliant robocaller" is typically an otherwise reputable person or entity placing automated telephone calls that deliver a recorded message in a manner that is possibly negligent in failing to comply with state and federal laws governing use of auto-dialers. For example, despite honest intentions and attempts to remain TCPA-complaint, a robocaller may place a call to a phone number that has been reassigned since the previous holder had consented to automated calls. The new end-user answers, becomes annoyed, and complains that the robocaller called without consent. Law abiding robocallers are particularly susceptible to customer list hygiene issues since end-users, who provide prior consent, often disconnect phone service without informing the robocaller. End-user opinions from owners of recycled phone numbers, who become annoyed because they are not a customer of the robocaller, are a telltale sign of such situations. In general, the severity of risk of non-compliant robocaller calls is minor, because negligent non-compliance involves harm caused by carelessness as opposed to an intent to do harm, and because the called party may bring a private right of action.

A "compliant robocaller" is typically a reputable entity whose calling behavior does not fall within the normal behavioral baseline of manually dialed calls, but for whom there is no (or negligible) report of abusive, fraudulent, or unlawful use of, or subscription to, telecom services. A typical behavior pattern may include a bank or merchant placing automated informational calls (bill-pay reminders, fraud alerts, debt-collection calls, flight status reminders, promotional offers, and so on) after receiving consent from the end user. In general, the severity of risk of compliant robocaller calls is negligible, as no foreseeable risk of harm or discomfort is present, and any foreseeable risk is no more than inconvenience.

A "norm-compliant" caller is typically a person or entity whose calling behavior falls within the normal behavioral baseline of manually dialed calls, with no malicious or unwanted calling behavior detected. A typical behavior pattern may include a caller manually placing a person-to-person call, with intent to speak with a specific person at a number called. In general, this situation does not entail any risk.

The above terminology permits a combination of the category and a likelihood of a given call being assigned to a category into a "risk rating matrix." Each cell in the risk rating matrix may be associated with a reputation score that ranges from −4 (worst possible reputation, high risk) to +4 (excellent reputation, little to no risk). An example of a risk rating matrix is illustrated in FIG. 1. With these categories, the system can approach the qualification of calling numbers by history, and characterization of the caller's reputation, e.g., Compliant-Robocaller, Non-Compliant Robocaller, Scammers, Spammers, Spoofers and, in general, reputable entities.

FIG. 2 is a block diagram that illustrates an example embodiment of a telephony provider system and an endpoint communication device configured for conducting automatic risk assessments of incoming calls according to various aspects of the present disclosure. Typically, the telephony provider system 202 is a system for providing mobile telephony communications. However, in some embodiments, the telephony provider system 202 may enable another type of telephony communication, including but not limited to public switched telephone network (PSTN) communication, voice-over-IP (VOIP) communication, push-to-talk (PTT) communication, or any other type of telephony communication wherein calls are routed from a calling device to a called device. Likewise, the endpoint communication device 204 is typically a wireless mobile communication device such as a mobile phone, but in some embodiments, may be a different type of device including but not limited to a wired telephone or a general purpose computing device executing a VOIP application. Depending on the type of telephony communication, the telephony provider system 202 may communicate with the endpoint communication device 204 using wired or wireless technologies known to those of ordinary skill in the art, including but not limited to plain old telephone service (POTS), 3G, 4G, LTE, TCP, and UDP.

As illustrated, the telephony provider system 202 includes a signal transfer point (STP) 228 and a service control point (SCP) 230. The STP 228 and SCP 230, along with a service switching point (SSP, not shown) are three defined network elements of the SS7 telecommunications standard. According to the SS7 telecommunications standard, the STP 228 manages signal traffic for connecting calls between carrier networks and for terminating (e.g., connecting, establishing) calls to endpoint communication devices, and the SCP 230 manages subscriber accounts and informatics for callers, including network-based caller information services.

The illustrated telephony provider system 202 also includes a risk assessment system 212. The illustrated risk assessment system 212 includes an information gathering engine 224, a call log data store 220, a model data store 222, a classified number data store 223, a machine learning engine 218, a model consuming engine 216, and a risk processing engine 214.

In general, the word "engine," as used herein, refers to logic embodied in hardware and/or software instructions, which can be written in a programming language, such as C, C++, C#, COBOL, JAVA™, PHP, Perl, HTML, CSS, JavaScript, VBScript, ASPX, Microsoft .NET™, and/or the like. An engine may be compiled into executable programs or written in interpreted programming languages. Engines may be callable from other engines or from themselves. Generally, the engines described herein refer to logical components that can be merged with other engines, or can be divided into sub engines. The engines can be stored in any type of computer readable medium or computer storage device and be stored on and executed by one or more general purpose computers, thus creating a special purpose computer configured to provide the engine.

As understood by one of ordinary skill in the art, a "data store" as described herein may be any suitable device configured to store data for access by a computing device. One example of a data store is a key-value store. However, any other suitable storage technique and/or device capable of organizing and storing the data may be used, such as a relational database management system (RDBMS), an object database, and/or the like. Other examples of a data store may also include data stored in an organized manner on a computer-readable storage medium, as described further below.

One example of a data store which includes reliable storage, but also low overhead, is a file system or database management system that stores data in files (or records) on a computer readable medium such as flash memory, random access memory (RAM), hard disk drives, and/or the like. Such a data store may be likely to be used locally by the endpoint communication device 204. One example of a data store is a highly reliable, high-speed RDBMS or key-value store executing on one or more computing devices and accessible over a high-speed packet switched network. Such data stores may be likely to be used by components of the telephony provider system 202. One of ordinary skill in the art will recognize that separate data stores described herein may be combined into a single data store, and/or a single data store described herein may be separated into multiple data stores, without departing from the scope of the present disclosure.

In some embodiments, the information gathering engine 224 is configured to collect information in order to assess risk for incoming calls. In some embodiments, the information gathering engine 224 may receive information from the STP 228 or SCP 230 as calls come in to the telephony provider system 202, and may create call log records in the call log data store 220 that include the information. In some embodiments, the information gathering engine 224 may also augment this information with relevant information from other sources. For example, for a given call, the information gathering engine 224 may find other information related to the calling number that is not necessarily related to the given call, including but not limited to a number of complaints filed related to the calling number, a call rate associated with the calling number, and so on. Further discussion of the types of information that may be collected by the information gathering engine 224 is provided below.

In some embodiments, the machine learning engine 218 processes call log records stored in the call log data store 220 in order to generate models usable to predict a level of risk associated with incoming calls. In some embodiments, the machine learning engine 218 generates classification models, such as naïve Bayes models, neural networks, or decision trees, that may be used to sort incoming calls into two or more categories. Each category may characterize the type of caller and may be indicative of a given level of risk. The models may also determine a likelihood that the output of the model is correct for a given incoming call. For example, for a given incoming call, the model may be usable to determine that the given incoming call is associated with a "robocaller" category with a 75% likelihood that the determination is correct. Once the machine learning engine 218 generates a model, it may be stored in the model data store 222. Further discussion of the generation of models by the machine learning engine 218 is provided below.

In some embodiments, the model consuming engine 216 retrieves a model from the model data store 222, and uses it to generate category and likelihood information for information associated with incoming calls. In some embodiments, the classified number data store 223 is configured to store category and likelihood information determined for calling numbers by other portions of the risk assessment system 212, as discussed elsewhere herein.

In some embodiments, the risk processing engine 214 may manage the process of receiving incoming call information from the STP 228 or SCP 230, providing features based on the incoming call information to the model consuming engine 216 for generation of category and likelihood information, and providing the category and likelihood information to the endpoint communication device 204. In some embodiments, the risk processing engine 214 may also receive feedback from the endpoint communication device 204 about a given call, and may update a call log record associated with the given call with the feedback. The illustrated telephony provider system 202 also includes one or more additional data sources 226. The additional data sources 226 may include any other type of information that may be useful to provide as features to the machine learning engine 218. Further discussion of the actions performed by the model consuming engine 216 and the risk processing engine 214, as well as the types of information available from the additional data sources 226, is provided below.

Overall, the risk assessment system 212 may be made up of one or more computing devices. In some embodiments, the one or more computing devices may include one or more computing devices that are each configured to provide all of the illustrated engines. In some embodiments, the one or more computing devices may include one or more computing devices that each have specific functionality. For example, one or more of the computing devices may be configured to provide a machine learning engine 218, one or more of the computing devices may be configured to provide an information gathering engine 224, and so on. In some embodiments, the computing devices of the risk assessment system 212 may be co-located or otherwise on same network as the STP 228 and SCP 230. In some embodiments, components of the risk assessment system 212 could be provided by the SCP 230 itself. Each of the components of the telephony provider system 202 may communicate with the other components of the telephony provider system 202 via any suitable wired or wireless communication technology, including but not limited to Ethernet or fiber-optic networking technologies.

As illustrated, the endpoint communication device 204 includes a call handler engine 208, a risk processing engine 206, a model consuming engine 210, and a classified number data store 211. In some embodiments, the call handler engine 208 is responsible for receiving an incoming call page from the telephony provider system 202, presenting an interface to the end user to accept or reject the call, and to otherwise manage communication between the end user and the telephony provider system 202 in relation to a call. Often, the call handler engine 208 may be installed on the endpoint communication device 204 by its manufacturer or by the carrier associated with the telephony provider system 202, and the call handler engine 208 installed may be augmented to operate with the risk assessment system 212.

The risk processing engine 206, model consuming engine 210, and classified number data store 211 are configured to perform similar actions to the risk processing engine 214, model consuming engine 216, and classified number data store 223 illustrated in the risk assessment system 212 at the telephony provider system 202. These components are illustrated in both places and as optional because, in various embodiments, the actions described may be performed on either the risk assessment system 212, the endpoint communication device 204, or both, with various advantages and benefits to either configuration.

For example, in some embodiments, the risk processing engine 206 of the endpoint communication device 204 may receive call page data, may determine features based thereon using information stored by the endpoint communication device 204, and may use the model consuming engine 210 of the endpoint communication device 204 to determine a risk assessment. Such embodiments may have an advantage of increased speed and responsiveness to the end user.

As another example, in some embodiments, the model consuming engine 216 and the risk processing engine 214 of the risk assessment system 212 may receive the call page information before it is transmitted to the endpoint communication device 204, and may make the risk assessment to be provided to the call handler engine 208 or risk processing engine 206 of the endpoint communication device 204. Such embodiments may have an advantage of working with endpoint communication devices 204 that have less computing power, less storage space, or are unable to form rich IP-based communication links to the telephony provider system 202, either at all or during a voice call. Such embodiments may also have an advantage of protecting secrecy of the model used to generate the risk assessment, thereby reducing a risk that the model could be reverse engineered and defeated by unscrupulous parties.

As yet another example, in some embodiments, a hybrid implementation may be used, wherein some actions, such as application of the model to the features, are performed at the risk assessment system 212, and some actions, such as determination of features based on the call page, are performed at the endpoint communication device 204. Such embodiments may have advantages of being able to provide a balance of secrecy for the model and responsiveness for the end user.

As still another example, in some embodiments, the endpoint communication device 204 may retrieve category and likelihood value information that has been predetermined by the risk assessment system 212 for a plurality of calling numbers, and may store the predetermined category and likelihood value information in the classified number data store 211. Such embodiments may have advantages of being able to provide risk assessments for the calling numbers stored in the classified number data store 211 even if no data connection between the endpoint communication device 204 and the risk assessment system 212 is available at the time of an incoming call. This is particularly likely to occur in CDMA networks where it is not possible to establish concurrent data connections and voice connections between the endpoint communication device 204 and the telephony provider system 202 (or any other system).

In addition to the above description of other embodiments, it should be noted that the components described above are described "as illustrated" because in some embodiments, the components may be laid out differently. For example, in some embodiments, components of the risk assessment system 212 may be within the SCP 230, or may be provided outside of the telephony provider system 202 and accessed either directly by the endpoint communication device 204 or by the endpoint communication device 204 via the telephony provider system 202. As another example, one or more of the additional data sources 226 may be outside of the telephony provider system 202, including but not limited to external review web sites, government sources of information, and other telephony provider systems.

Figure 3:
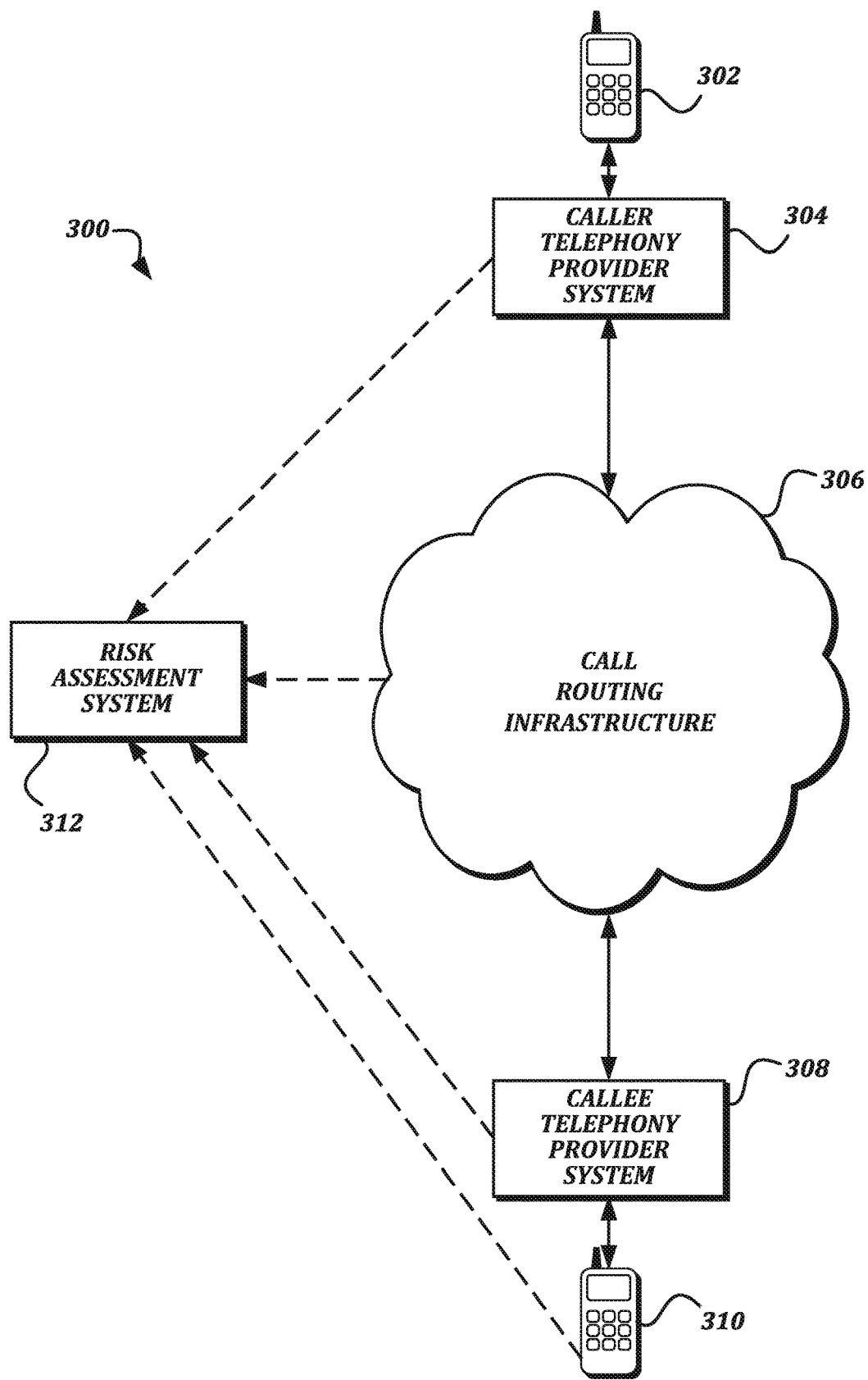
FIG. 3 is a schematic diagram that illustrates an example embodiment of a risk assessment system that is provided outside of a telephony provider system according to various aspects of the present disclosure.

FIG. 3 is a schematic diagram that illustrates an example embodiment of a risk assessment system that is provided outside of a telephony provider system according to various aspects of the present disclosure. As shown in the illustrated embodiment of the system 300, a calling endpoint device 302 accesses a telephony network via a caller telephony provider system 304, and the callee endpoint device 310 accesses the telephony network via a callee telephony provider system 308. Calls are routed from the caller telephony provider system 304 to the callee telephony provider system 308 and are otherwise processed using a call routing infrastructure 306. The call routing infrastructure 306 may provide one or more of a variety of services, including but not limited to an SS7 network, a caller name (CNAM) data service, a do-not-call database, and an 8XX call routing system. For each of these services, the call routing infrastructure 306 may receive information about a call, including a caller number, a called number, and a date and/or time of the call. Any element of the system 300, including the caller telephony provider system 304, the call routing infrastructure 306, and the callee telephony provider system 308, may report the information about the call to the risk assessment system 312, which is similar to the risk assessment system 212 illustrated and described above. Such an embodiment may allow the risk assessment system 312 to receive information about massive numbers of calls, thus providing a large amount of data to the machine learning engine 218. For example, an SS7 network may process hundreds of millions of calls every day. Information about all of these calls (or statistical information that aggregates information about all of these calls) may reliably be provided to the risk assessment system 312 by using the system 300 as illustrated in FIG. 3.

Figure 4A:
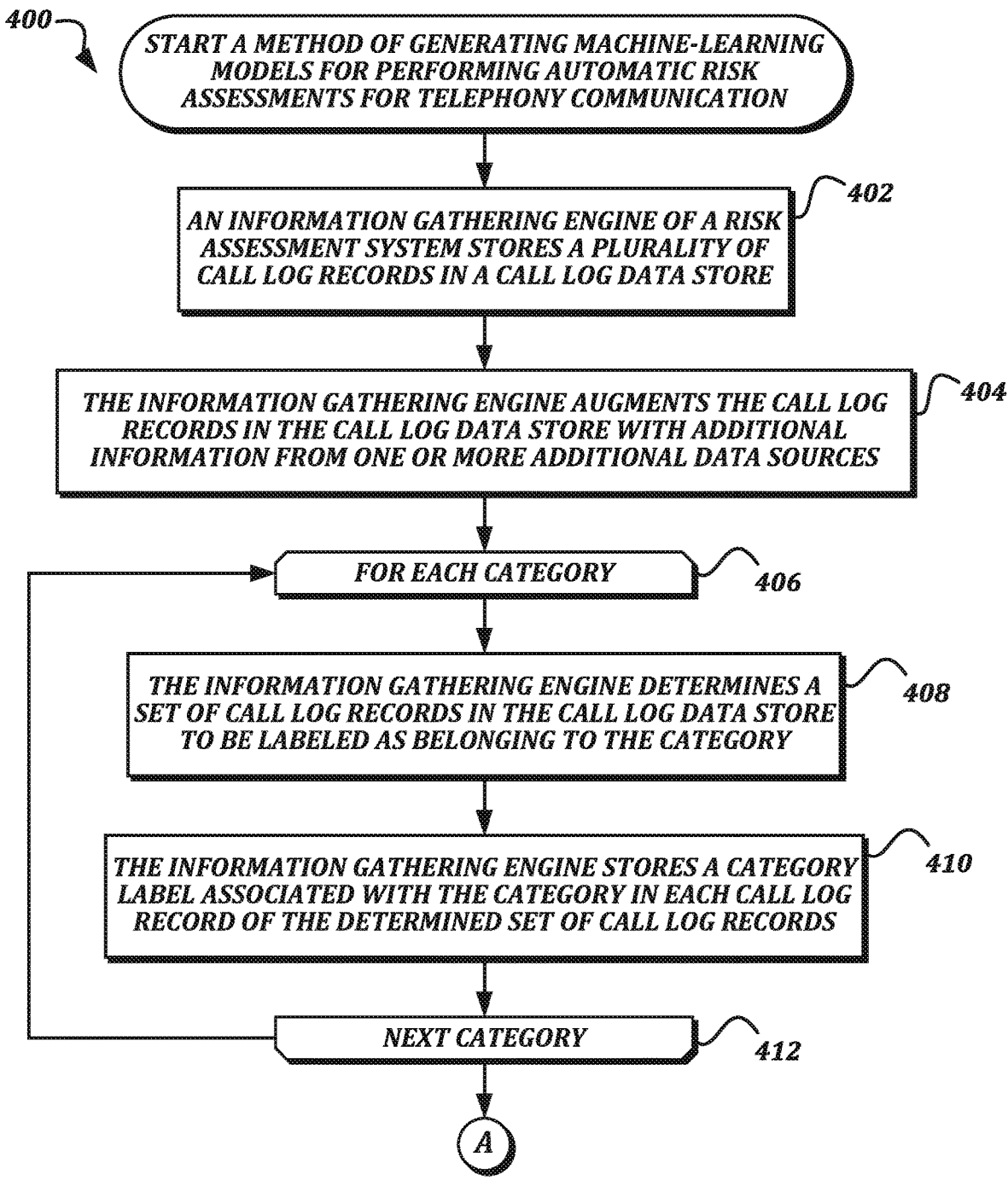
FIGS. 4A-4B are a flowchart that illustrates an example embodiment of a method of generating machine-learning models for performing automatic risk assessments for telephony communication according to various aspects of the present disclosure.
Figure 4B:
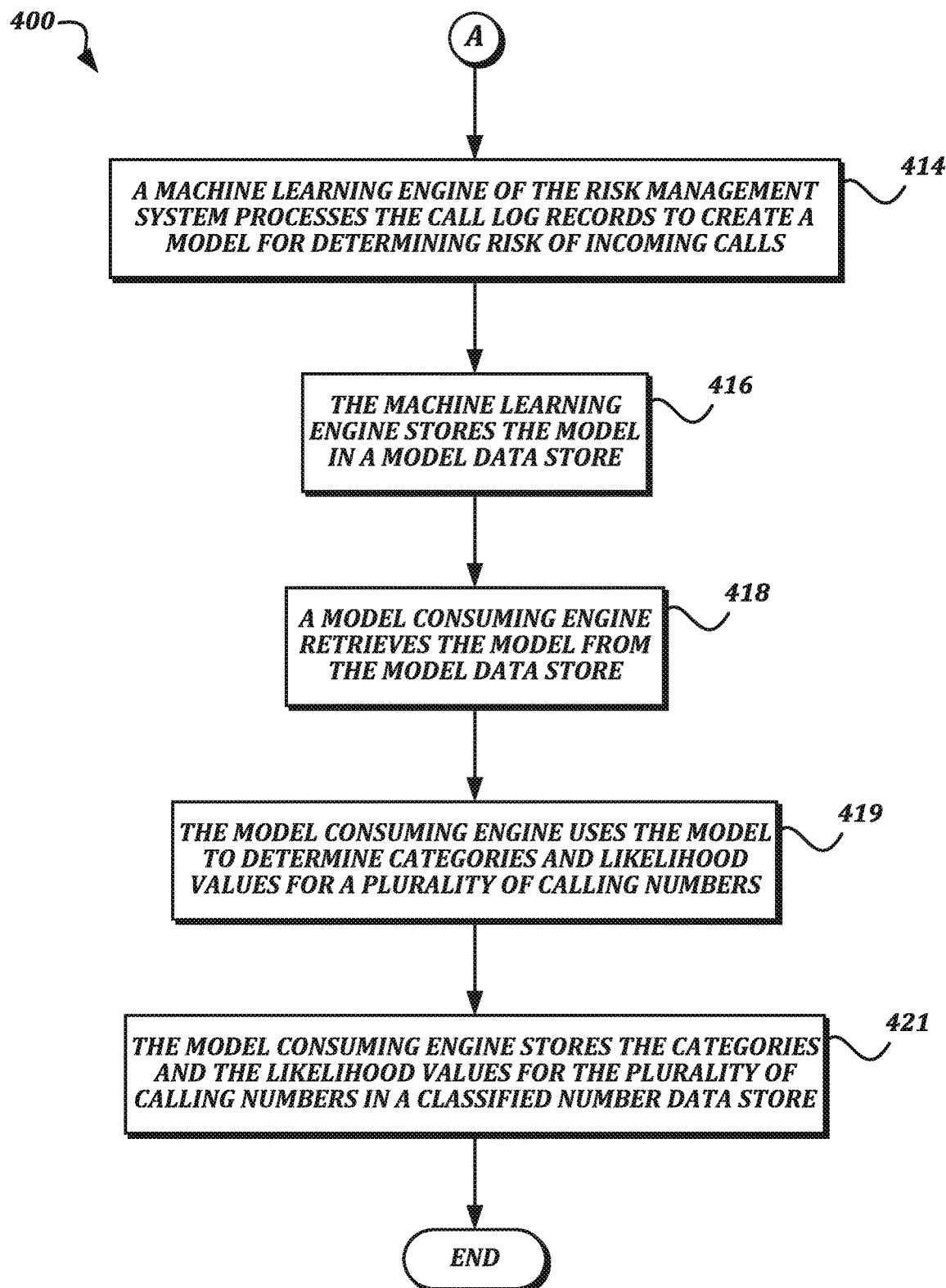

FIGS. 4A-4B are a flowchart that illustrates an example embodiment of a method of generating machine-learning models for performing automatic risk assessments for telephony communication according to various aspects of the present disclosure. From a start block, the method 400 proceeds to block 402, where an information gathering engine 224 of a risk assessment system 212 stores a plurality of call log records in a call log data store 220. In some embodiments, the call log records may be obtained from a source outside of the risk assessment system 212, including but not limited to a call log stored by another component of the telephony provider system 202. In some embodiments, the call log records may initially be provided to the risk assessment system 212 organically as calls are processed by the telephony provider system 202 as described further below. Typically, before being augmented, a call log record may initially include information that is derivable from a call itself, including but not limited to information from the incoming call event such as a reported caller number, a reported CNAM value, a service provider of the caller (e.g., an identifier, a category such as ILEC, CLEC, etc.), a type of caller (e.g., VOIP, wireless, wireline, toll-free), and a duration of the call. In some embodiments, the call log record may initially only include the caller number, the date/time of the call, and possibly the called number, in order to help preserve privacy.

At block 404, the information gathering engine 224 augments the call log records in the call log data store 220 with additional information from one or more additional data sources 226. A large variety of information may be accessed from the additional data sources 226 in order to augment the call log records with further information that can help perform risk assessments. Some non-limiting examples of information that may be used include:

- Statistics regarding transactions associated with the calling number, including but not limited to an average daily volume, an outbound volume, and an inbound volume
- Outbound traffic characteristics, including but not limited to kurtosis, correlation, call rate, whether the phone number is cold, and a number of days seen
- End-user opinions related to the calling number that have been submitted to a review site
- Corroborating directory assistance listings that include data that matches the data presented in the call page (e.g., a YP.com query for the caller number returns a name that matches the CNAM value)
- Whether the calling number, Caller ID name, or directory assistance listing matches an entity accredited with an agency (e.g., the Better Business Bureau, Dunn and Bradstreet)
- Whether the calling number, Caller ID name, or directory assistance listing matches a reputable type of caller (e.g., a physician)
- Whether the calling number appears in domain registry information associated with a web site of an associated business entity
- Whether third-party websites indicate that the calling number is associated with a company identified in the Caller ID name
- A rate of complaints for a calling number (e.g., a percentage of calls from the given calling number that received complaints, determined from previous call log entries, or from a separate data source)
- Whether the calling number is associated with a carrier from which the call was received, as determined by the North American Numbering Plan Administrator
- Whether any reports have been made regarding callbacks to the calling number determining that the calling number is disconnected
- A rate of pick-ups (e.g., a percentage of calls from the given calling number that are picked up by end-users, determined from previous call log entries, or from a separate data source)
- Statistics regarding the length of previous calls from the calling number
- Traffic characteristics including but not limited to a number of query sources and a number of services
- Inbound traffic characteristics, including but not limited to a number of days seen, and a count per day In some embodiments, the information gathering engine 224 may review information submitted about previous calls in great detail. For example, in some embodiments, the information gathering engine 224 may analyze records to obtain information relating to what occurred during calls associated with the caller number. This information may include whether pre-recording messages were played, whether the nature of the message was a sales pitch, whether there were red-flag warnings of fraud such as requests for private personal or financial information, or whether there were any confirmed reports of scams from the caller number. In some embodiments, the information gathering engine 224 may obtain this information from end user reports. In some embodiments, the information gathering engine 224 may extract this information from recordings of calls using speech recognition techniques. In some embodiments, the information gathering engine 224 may conduct sentiment analysis on either textual reports submitted by end users, transcripts of call recordings generated by speech recognition techniques, or biometric sentiment analysis on the call recordings in order to detect sentiment (e.g., happy, angry, frustrated, annoyed) in an interaction with the calling number. In some embodiments, the information gathering engine 224 may use all such data available. In other embodiments, the information gathering engine 224 may use data within a sliding window of appropriate length, such as 56 days.

The method 400 then proceeds to a for loop defined between a for loop start block 406 and a for loop end block 412, wherein the call log records are labeled with categories in a plurality of categories. As discussed above, some example categories may include "norm-compliant," "compliant-robocaller," "non-compliant robocaller," "spammer," "spoofer," and "scammer." In some embodiments, subcategories may also be used. For example, subcategories for a robocaller category may include one or more of (a) customer-service; (b) customer-survey; (c) debt-collector; (d) political-campaign; (e) fax-machine; (f) public-safety; or (g) unknown robocaller.

For a given category, the method 400 proceeds from the for loop start lock 406 to block 408, where the information gathering engine 224 determines a set of call log records in the call log data store to be labeled as belonging to the category. Then, at block 410, the information gathering engine 224 stores a category label associated with the category in each call log record of the determined set of call log records. In some embodiments, the call log records may be labeled with categories via human input. This could either be done in a bulk fashion, or could be done during or shortly after completion the calls associated with the call log records (similar to as described further below for new calls). In some embodiments, the call log records may be labeled by virtue of thresholds set for various features. For example, a threshold could be established that any call log record that has a rate of complaints greater than 10% and has a report of a request for personal information is labeled as a "scammer." In some embodiments, the call log records may be automatically grouped using a clustering technique to determine groups that can be distinguished by the data alone. These groups may then be inspected and assigned to categories. In some embodiments, all of the call log records stored in the call log data store 220 may be labeled in this manner. In some embodiments, a training set of call log records may be sampled from the call log data store 220, instead of labeling all of the call log records.

The method 400 then proceeds to the for loop end block 412. If more categories remain to be processed, the method 400 returns to the for loop start block 406 to process the next category. Otherwise, the method 400 proceeds to a continuation terminal ("terminal A"). Though an embodiment that loops through the categories and picks sets of call log records associated with each category is illustrated and described, in some embodiments, a for loop steps through a set of call log records and determines a category for each record instead. In other embodiments, call log records may be labeled individually by end users during or after the associated calls.

From terminal A (FIG. 4B), the method 400 proceeds to block 414, where a machine learning engine 218 of the risk management system 212 processes the call log records to create a model for determining risk of incoming calls. Once created, at block 416, the machine learning engine 218 stores the model in a model data store 222. Because the machine learning engine 218 operates over labeled call log records, any suitable supervised learning technique may be used. In some embodiments, the model may be a decision tree or a naïve Bayes classifier. These types of models provide relatively simple computation and expression, and can be implemented to quickly process call log records. A decision tree model produces a category and a likelihood value at its leaf nodes. The splitting method for constructing the decision tree may be based on features selected from the information stored in the call log records. While including as many features as possible may lead to the most accurate model, it may be desirable to train models that can operate on "fast data" instead of "slow data." That is, a model that can predict a category and likelihood for an incoming call based merely on information that is available either in the call event itself (such as the caller number and the called number), characteristics of the call, or stored statistical data for transactions related to the calling number that can be automatically collected by the telephony provider system 202, may be preferred for reviewing new calls over a model that uses features based on "slow data" such as reviews submitted by end-users. In part, this is because some unscrupulous callers may quickly change to new calling numbers, and so it may take time before enough end-user reviews are collected to be helpful.

Accordingly, some appropriate features may include one or more of:

Auto-Dialer Detection: this feature may be used to separate out callers that employ auto-dialers from callers who manually place calls. An average daily call rate threshold is used to trigger the classification, which is based on a rolling 56-day average of calls observed being placed by the caller. A positive test result may cause the caller being categorized as a 'robocaller,' or of having a likelihood of being categorized as a robocaller increased.

Outbound Call Center Rating: used in conjunction with the auto-dialer-detection feature, this feature may negatively influence a caller's reputation score based on the presence of volatility in a caller's outbound call center traffic. The feature implements a similar statistical model ('autocorrelation') to one that stock markets use to measure volatility in stock prices. The greater the volatility, the poorer the call center's reputation score.

Cold Telephone Number Test: this feature may negatively influence a caller's reputation score based on the caller's calls suddenly coming from a new or "cold" (e.g. recently recycled) telephone number. Used in conjunction with the auto-dialer-detection and call-center-rating features, suspicious auto-dialer behavior from a 'cold-telephone-number' will cause the service to impugn a negative ('−') reputation score upon the corresponding caller.

Service Provider Identification: this feature performs a portability-corrected service provider identification lookup meant to determine if the caller's telephone number can be traced back to a responsible carrier-of-record. Failure to resolve the caller's telephone number to a valid Service Provider Identifier (SPID) or Operating Company Number (OCN) may result in the caller being categorized as a 'spoofer,' or increasing the likelihood that the caller will be categorized as a spoofer.

Line Type Lookup: used in conjunction with the auto-dialer detection feature, this feature may negatively influence a caller's reputation score based on a probabilistic risk assessment that evaluates risks associated with high volume lines (such as a suspicious wireless connection placing thousands of calls a day).

Accepted-Rate: this feature may positively influence a caller's reputation score based on calls answered, this ratio may be computed as the number of calls seen minus the number of calls rejected, divided by the number of calls seen.

Reject-Rate: this feature may negatively influence an end-user's reputation based unanswered calls, this ratio is computed as the number of calls seen minus the number of calls accepted, divided by the number of calls seen.

Unknown End-User Rate: this feature may negatively influence a caller's reputation score based on the ratio of disconnected and invalid telephone numbers the caller attempts to call in comparison to the total number of calls placed by the caller. Unknown end-user rates are taken directly from call-events, indicating the caller's attempt to place a call to a telephone number which is not assigned to a valid end-user.

Service Duration: this feature is used to indicate how long a caller has subscribed to the use of a telephone number, which allows the caller to gradually establish a reputation as a legitimate caller.

Active Line Indicator: this feature indicates whether a telephone number has made recent outbound activity and may positively influence a caller's reputation based on the duration at which the phone has been active.

Sender Permitted Form: this feature is designed to detect caller-id spoofing by describing a list of telephone numbers associated with inbound only call center activity such as bank's credit card activation number.

At block 418, a model consuming engine retrieves the model from the model data store 222. Next, at block 419, the model consuming engine uses the model to determine categories and likelihood values for a plurality of calling numbers. In some embodiments, the model may have been trained using a subset of the call log records, and the plurality of calling numbers for block 419 may be the rest of the call log records that were not included in the subset used for training. At block 421, the model consuming engine stores the categories and the likelihood values for the plurality of calling numbers in a classified number data store. This allows a query for a category and likelihood value for any of the plurality of calling numbers to be returned quickly, without having to process the calling number through the model. The method 400 then proceeds to an end block and terminates.

FIGS. 5A-5D are a flowchart that illustrates an example embodiment of a method of determining a reputation score for incoming calls using a machine-learning model according to various aspects of the present disclosure. From a start block, the method 500 proceeds to block 518, where a model consuming engine retrieves the model from the model data store 222. As discussed above, this could be the model consuming engine 216 at the risk assessment system 212, or the model consuming engine 210 on the endpoint communication device 204, depending on the deployment of the particular embodiment. The method 500 then proceeds to block 520, where an incoming call is received by the telephony provider system 202, wherein the incoming call is intended for an endpoint communication device 204. The incoming call is addressed to the endpoint communication device 204 by virtue of a called telephone number, a subscriber identifier, or other identifier of the endpoint communication device 204 as known to one of ordinary skill in the art of telephony. As further known to one of ordinary skill in the art of telephony, the incoming call arrives at the telephony provider system via the STP 228, and may subsequently be provided to the SCP 230. The SCP 230, in turn, provides information representing the incoming call to the risk assessment system 212. The information representing the incoming call includes at least a caller phone number and a caller name, one or more of which may be spoofed by the caller (e.g., may not accurately represent the source of the call).

Next, at block 522, the risk assessment system 212 creates a new call log record in the call log data store 220, the new call log record including the information representing the incoming call. The method 500 then proceeds to a decision block 524, where a determination is made regarding whether further processing of the incoming call will occur within the risk assessment system 212 or on the endpoint communication device 204. This determination may be based on an overall system configuration of the given embodiment, on a configuration made by the end user of the endpoint communication device 204, or in any other suitable way. If it is determined that the incoming call will be processed within the risk assessment system 212, then the result of decision block 524 is YES, and the method 500 proceeds to a continuation terminal ("terminal B"). Otherwise, if it is determined that the incoming call will be processed at the endpoint computing device 204, then the result of decision block 524 is NO, and the method 500 proceeds to a continuation terminal ("terminal C").

From terminal B (FIG. 5B), the method 500 proceeds to block 526, where a risk processing engine 214 of the risk assessment system 212 obtains a set of features based on the information representing the incoming call. Depending on the features used, the risk processing engine 214 may be able to obtain the features using information already stored in the new call log record, or may provide the information stored in the new call log record to the information gathering engine 224 in order to obtain the features from one or more additional data sources 226. For example, a line type lookup value may already be stored in the new call log record, but an accepted rate may need to be queried for the calling number from an additional data source 226. The actions of the information gathering engine 224 at this step may be similar to the actions described above in block 404.

At block 528, the risk processing engine 214 provides the features to a model consuming engine 216 of the risk assessment system 212, and at block 530, the model consuming engine 216 applies the model to the features to determine a category and a likelihood value. Given the nature of models such as decision trees and naïve Bayes classifiers, application of the model should be very fast.

At block 532, the telephony provider system 202 transmits a call page associated with the incoming call to the endpoint communication device 204. This transmission is typical of telephony communication as known to one of ordinary skill in the art, and may be part of the process of connecting the call to the endpoint communication device 204 that is referred to as "call termination." In some embodiments, the STP 228 may have been holding call termination until after block 530 so that the category and likelihood value were available as soon as possible after call termination.

At block 534, the risk processing engine 214 transmits the category and likelihood value to a risk processing engine 206 of the endpoint communication device 204. In some embodiments, the telephony provider system 202 may piggy-back the category and likelihood value information onto the call page or other messages sent to the endpoint communication device 204 during call termination. In some embodiments, the telephony provider system 202 may send the category and likelihood value information to the endpoint communication device 204 via a separate data channel, such as an IP connection initiated by the endpoint communication device 204 in response to receiving the call page, an application-directed SMS message transmitted by the telephony provider system 202, a warm socket connection as described in U.S. Pat. No. 9,002,334 (which is hereby incorporated by reference herein in its entirety for all purposes), or using any other suitable technique. The information may be transmitted directly from a computing device of the risk assessment system 212 to the endpoint communication device 204, or could be sent through the SCP 230 or other device of the telephony provider system 202. The method 500 then proceeds to a continuation terminal ("terminal D").

From terminal C (FIG. 5C), the method 500 proceeds to block 536, where the telephony provider system 202 transmits a call page associated with the incoming call to the endpoint communication device 204. This is similar to block 532 described above. Next, at block 538, a call handler engine 208 of the endpoint communication device 204 provides the incoming call page to a risk processing engine 206 of the endpoint communication device 204.

At block 540, the risk processing engine 206 obtains a set of features based on the based on the incoming call page. This is similar to block 526 described above, however, since it is occurring on the endpoint communication device 204, the risk processing engine 206 may restrict itself to using features provided in the incoming call page. This may reduce the accuracy of the prediction provided by the model, but it may reduce the processing time, power, and network bandwidth needed to obtain the features. In some embodiments, the risk processing engine 206 may retrieve extra features from the risk assessment system 212. In some embodiments, the risk assessment system 212 may provide the features described in block 528 to the endpoint communication device 204 as requested.

At block 542, the risk processing engine 206 provides the set of features to a model consuming engine 210 of the endpoint communication device 204, and at block 544, the model consuming engine 210 applies the model to the set of features to determine a category and a likelihood value, which it provides to the risk processing engine 206. This is similar to block 534 described above. The method 500 then proceeds to a continuation terminal ("terminal D").

One should note that the model consuming engine used in block 542 may be the model consuming engine 216 of the risk assessment system 212, instead of the model consuming engine 210 of the endpoint communication device 204. This would allow the model to remain protected, but would require additional communication between the endpoint communication device 204 and the telephony provider system 202. This may be useful if the risk assessment system 212 is separate from the telephony provider system 212, or if the risk assessment system 212 is split between the telephony provider system 212 and a separate server.

From terminal D (FIG. 5D), the method 500 proceeds to block 546, where the risk processing engine 206 of the endpoint communication device 204 provides the category and the likelihood value to the call handler engine 208, and then to block 548, where the call handler engine 208 processes the incoming call page using the category and the likelihood value. As discussed above, processing the incoming call page may include presenting a prompt to the end user to allow the end user to accept or reject the call. In some embodiments, the call handler engine 208 may use the category and likelihood value to automatically block the incoming call if the reputation score is too low. In some embodiments, the call handler engine 208 may present a graphical representation of the category, the likelihood value, and/or the resulting reputation score.

Figure 6A:
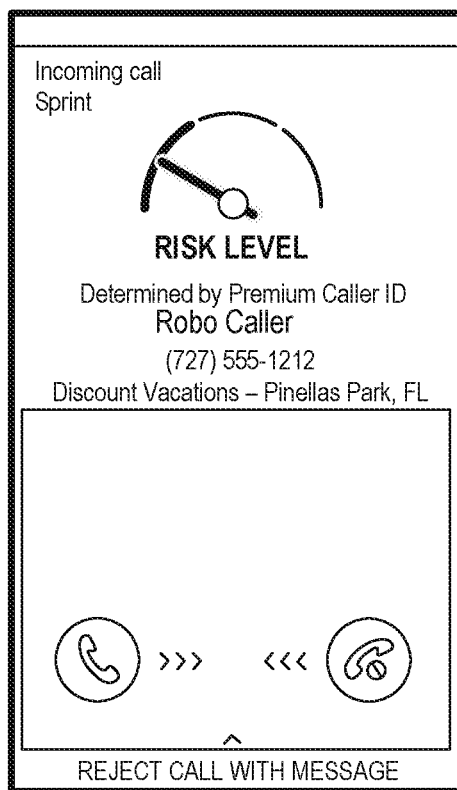
FIG. 6A illustrates an example embodiment of an interface used to present a reputation score, a category name, and buttons to allow the end user to accept or reject the call according to various aspects of the present disclosure.
Figure 6B:
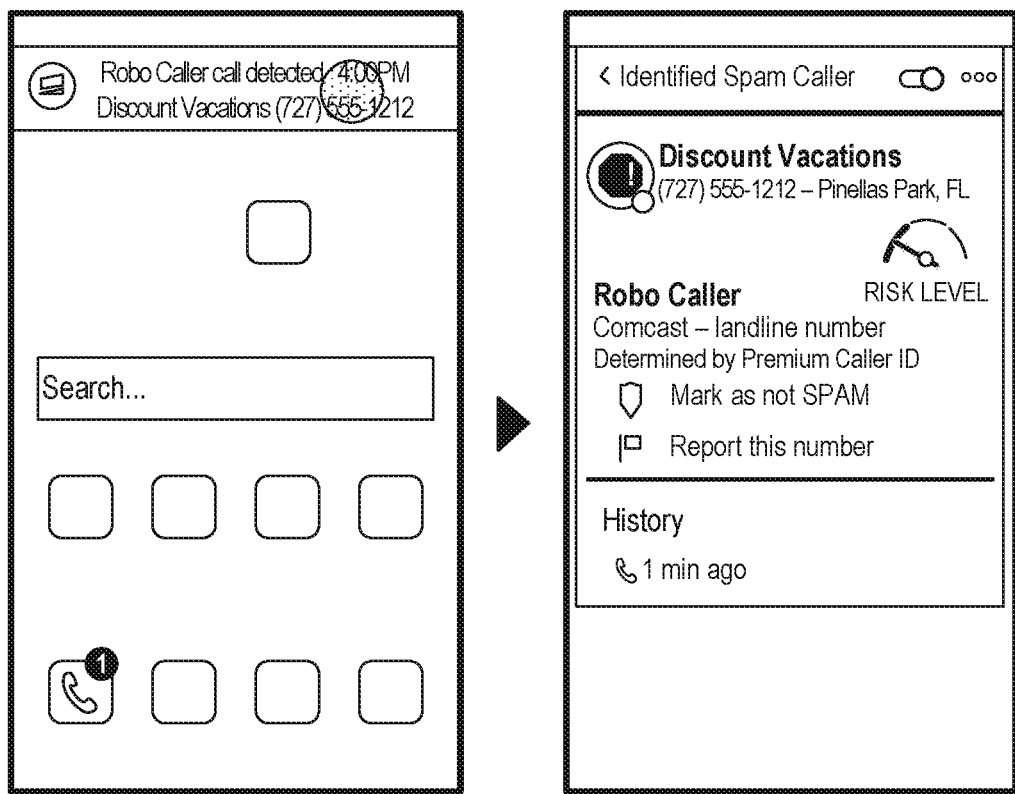
FIG. 6B illustrates an example embodiment of an interface used to present information related to a call that was automatically blocked according to various aspects of the present disclosure.

FIG. 6A illustrates an example embodiment of an interface used by the call handler engine 208 to present the reputation score (as a gauge that shows an amount of risk), a category name ("robo caller"), and buttons to allow the end user to accept or reject the call. FIG. 6B illustrates an example embodiment of an interface used by the call handler engine 208 to present information related to a call that was automatically blocked.

Returning to FIG. 5D, the method 500 then proceeds to block 550 where, after disconnection of the call, the risk processing engine 214 of the risk assessment system 212 updates the new call log record with additional information about the call. This information includes information that is available to the telephony provider system 202 by virtue of its position as the facilitator of the call. For example, this information may include whether the call was accepted, a duration of the call, a recording or transcript of the call, and the like. Next, at decision block 552, a determination is made regarding whether feedback about the call will be used to further train the model. Again, this determination may be a system-wide configuration, or could be a user-configured feature.

If feedback will not be used to further train the model, then the result of decision block 552 is NO, and the method 500 proceeds to an end block and terminates. Otherwise, if feedback will be used to further train the model, then the result of decision block 552 is YES, and the method 500 proceeds to block 554.

Figure 6C:
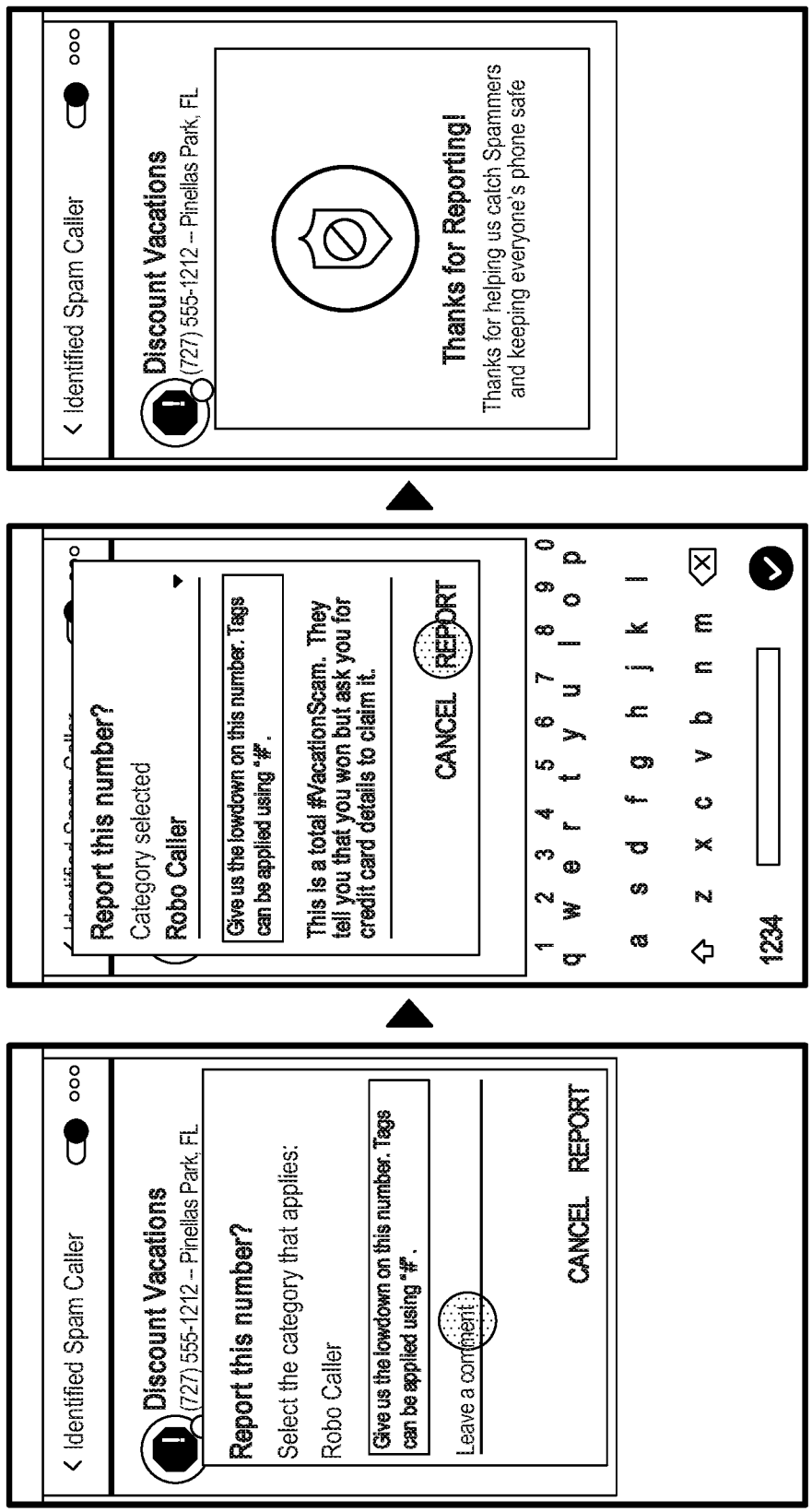
FIG. 6C illustrates an example embodiment of a labeling interface according to various aspects of the present disclosure.

At block 554, the risk processing engine 206 of the endpoint communication device 204 presents a labeling interface to receive a labeling input, and transmits the labeling input to the risk assessment system 212. The labeling interface may present a set of labels (e.g., "scammer," "compliant robo-caller," etc.) to the end user, who may select one of the labels to be associated with the call. The labeling interface may collect additional information as well, such as text reviews, complaints, ratings, or other forms of feedback. In some embodiments, the labeling interface may collect information usable to determine a sentiment level, such as a scale rating of whether the call was wanted or unwanted. In some embodiments, the call handler engine 208 may automatically extract sentiment information using biometric sentiment extraction techniques. Once collected, the labeling interface causes the feedback to be transmitted to the risk assessment system 212. In some embodiments, the feedback may be provided anonymously. In some embodiments, the feedback may be transmitted in a way that ensures legitimacy of the feedback, including but not limited to ensuring that it was transmitted by a device that received the associated call. An example of a labeling interface is shown in FIG. 6C.

At block 556 (FIG. 5D), the risk assessment system 212 stores the labeling input in the new call log record. The method 500 then proceeds to block 558, where the machine learning engine 218 processes call log records in the call log data store 220, including the new call log record, to create an updated model, and then to block 560, where the machine learning engine 218 stores the updated model in the model data store 222. The actions of blocks 558 and 560 may be performed each time a new label is received, or may be done intermittently based on a time period, based on an addition of a given number of call log records, or over any other suitable interval.

The method 500 then proceeds to an end block where it terminates. One of ordinary skill in the art will recognize that, typically, the method 500 will loop back to block 520 to process another call instead of terminating, but this loop has not been illustrated here for the sake of brevity. One of ordinary skill in the art will also recognize that portions the method 500, particularly the portions after block 520 that relate to processing incoming calls, may be conducted multiple times in parallel in order to high amounts of call throughput.

Figure 7:
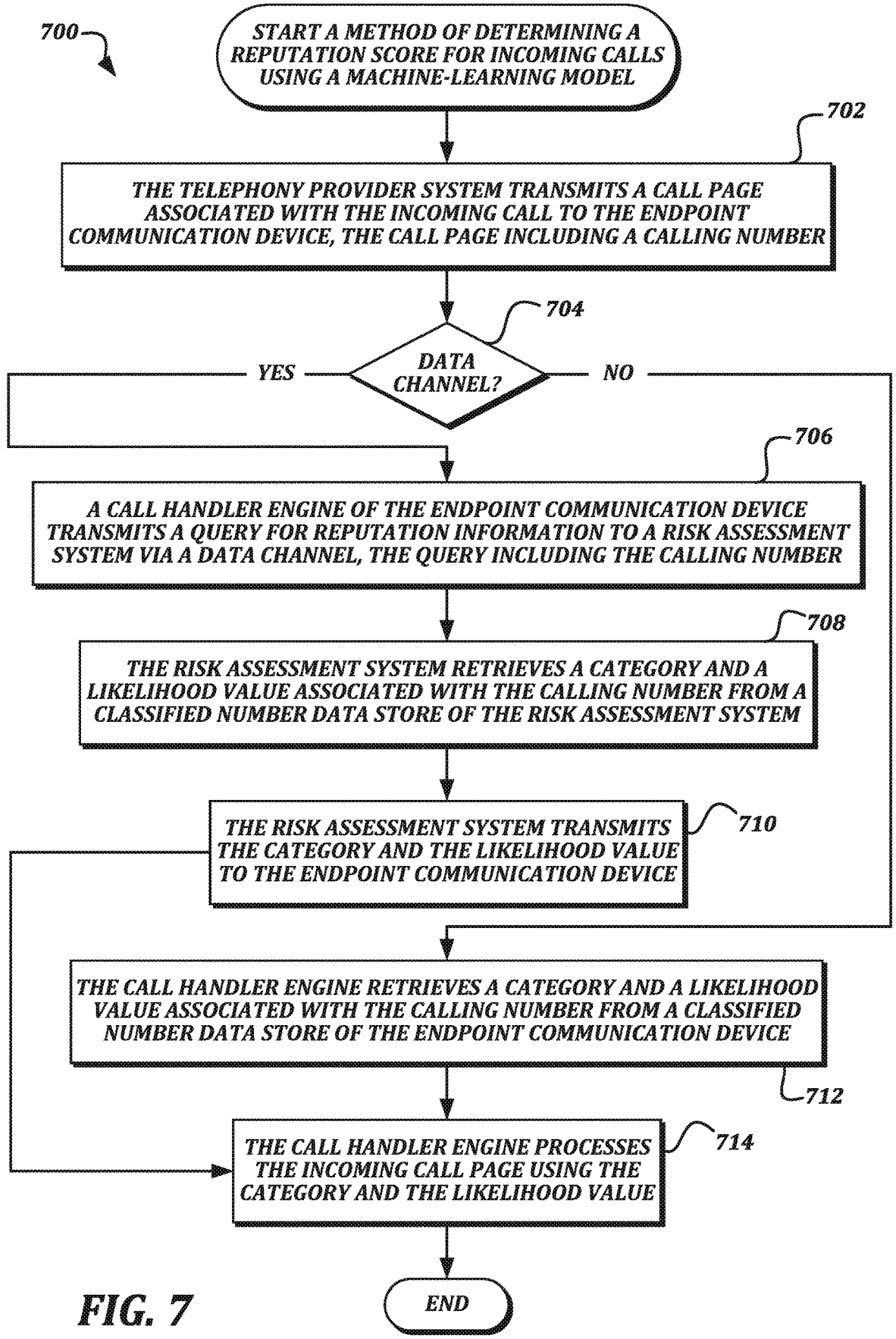
FIG. 7 is a flowchart that illustrates an example embodiment of a method of determining a reputation score for incoming calls using a machine-learning model according to various aspects of the present disclosure.

FIG. 7 is a flowchart that illustrates an example embodiment of a method of determining a reputation score for incoming calls using a machine-learning model according to various aspects of the present disclosure. While some portions of the method 700 are similar to those in method 500, the method 700 uses the stored classified number data that was generated using the model created in the method 400 outside of the scope of any incoming call, instead of processing incoming call information using the model. Using the model to process incoming call information (as described in method 500) can have the benefit of being able to provide reputation scores for incoming call information that has not been seen before. On the other hand, using stored classified number data instead of using the model may allow greater throughput while consuming less computing resources, and may allow reputation scores to be determined by an endpoint communication device 204 without using a data connection to the risk assessment system 212.

From a start block, the method 700 proceeds to block 702, where the telephony provider system 202 transmits a call page associated with the incoming call to the endpoint communication device 204, the call page including a calling number. The method 700 then proceeds to a decision block 704, where a determination is made regarding whether a data channel is available. For some communication technologies (for example, 4G or LTE), concurrent voice and data transmissions between the endpoint communication device 204 and other devices may be possible. For such technologies, the data channel may always be available.

For other communication technologies (for example, CDMA), concurrent voice and data transmissions between the endpoint communication device 204 and other devices may not be possible. With such technologies, data communication may be possible before a call rings, depending on how the call handler engine 208 is implemented. For example, the call handler engine 208 may be configured to use the risk assessment system 212 to process the incoming call before establishing the voice channel. In such an embodiment, the data channel may be available when the method 700 arrives at decision block 704 even if concurrent data and voice channels cannot be established. As another example, the call handler engine 208 may be configured to establish the voice channel before the risk assessment processing. In such an embodiment, the data channel may not be available when the method 700 arrives at decision block 704. As still another example, the endpoint communication device 204 may not be capable of data communication at all when the incoming call is received (such as an endpoint communication device 204 that can have its classified number data store 211 updated when coupled to a computing device via a physical connection, but does not include a wireless data communication interface).

If a data channel is available, then the result of the determination at decision block 704 is YES, and the method 700 proceeds to block 706. At block 706, a call handler engine 208 of the endpoint communication device 204 transmits a query for reputation information to a risk assessment system 212 via a data channel, the query including the calling number. The risk assessment system 212 may be within the telephony provider system 202, or may be provided separately as illustrated in FIG. 3. At block 708, the risk assessment system 212 retrieves a category and a likelihood value associated with the calling number from a classified number data store 223 of the risk assessment system 212, and at block 710, the risk assessment system 212 transmits the category and the likelihood value to the endpoint communication device 204. The method 700 then proceeds to block 714.

Returning to decision block 704, if a data channel is not available, then the result of the determination at decision block 704 is NO, and the method 700 proceeds to block 712. At block 712, the call handler engine 208 retrieves a category and a likelihood value associated with the calling number from a classified number data store 211 of the endpoint communication device 204.

The category and likelihood values included in the classified number data store 211 may be retrieved in batches from the classified number data store 223 of the risk assessment system 212 outside of the scope of an incoming call. This retrieval may be conducted in an automatic, periodic fashion, or in response to user requests. In some embodiments, the size of the classified number data store 211 on the endpoint communication device 204 may be limited, and so only a portion of the information from the classified number data store 223 of the risk assessment system may be transferred. In such embodiments, information for numbers that have the lowest reputation scores (e.g., combinations of categories and likelihood values that receive a reputation score of "−4" in the chart of FIG. 1) may be copied to the classified number data store 211 first, in order to protect the endpoint communication device 204 from the least reputable callers. Thereafter, information for numbers with higher reputation scores may be copied to the classified number data store 211 in decreasing order of risk (e.g., first numbers with a reputation score of "−3," then numbers with a reputation score of "−2," etc.), until the classified number data store 211 is full.

Once the category and likelihood value has been retrieved, the method 700 proceeds to block 714. At block 714, the call handler engine 208 processes the incoming call page using the category and the likelihood value. This is similar to block 548 illustrated and discussed above. In some embodiments, category and likelihood values for a given caller number may not be present in the classified number data store. In such cases, the call handler engine 208 may present default values for the category value, and/or may indicate that the calling number has an unknown level of risk.

Figure 5A:
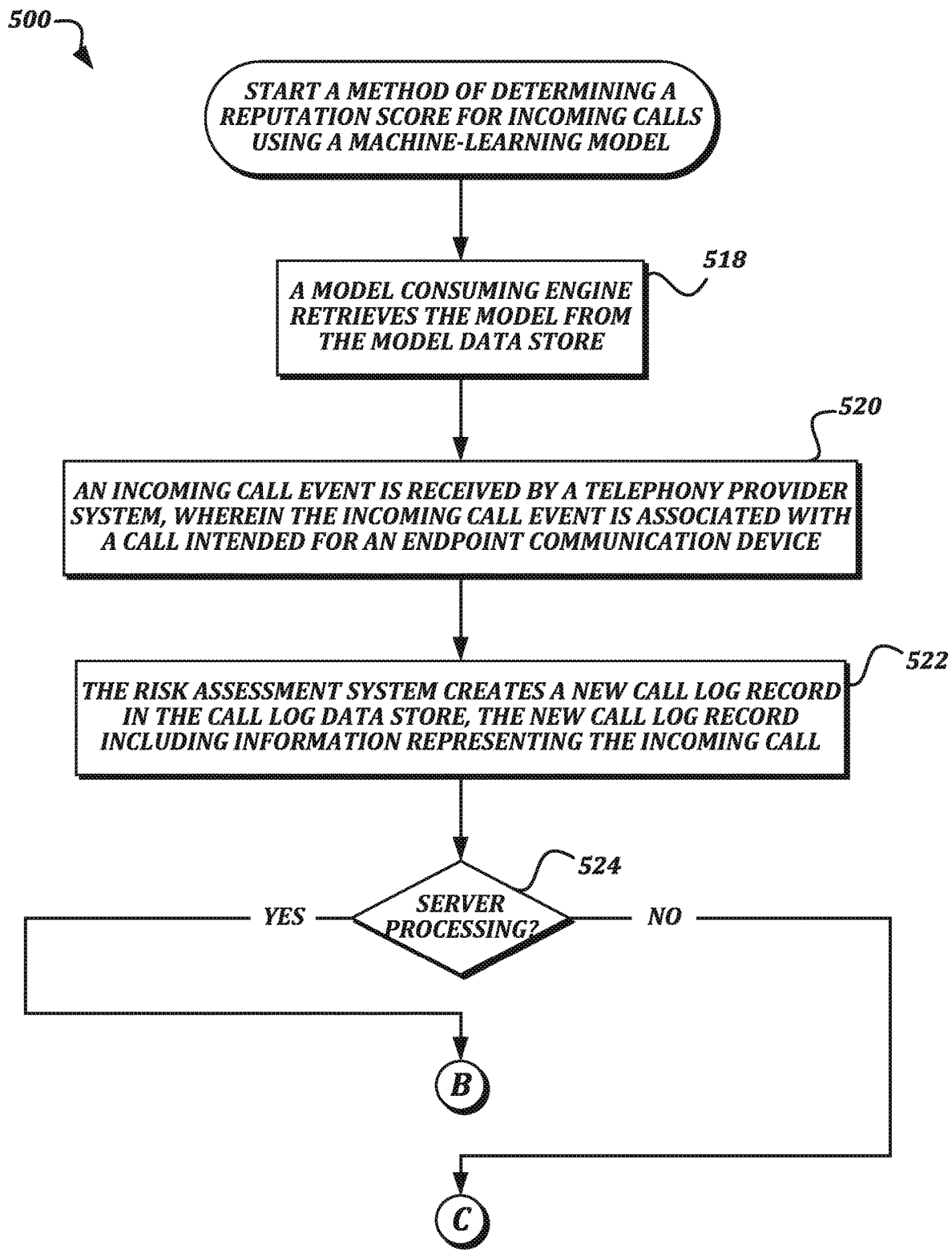
FIGS. 5A-5D are a flowchart that illustrates an example embodiment of a method of determining a reputation score for incoming calls using a machine-learning model according to various aspects of the present disclosure.
Figure 5B:
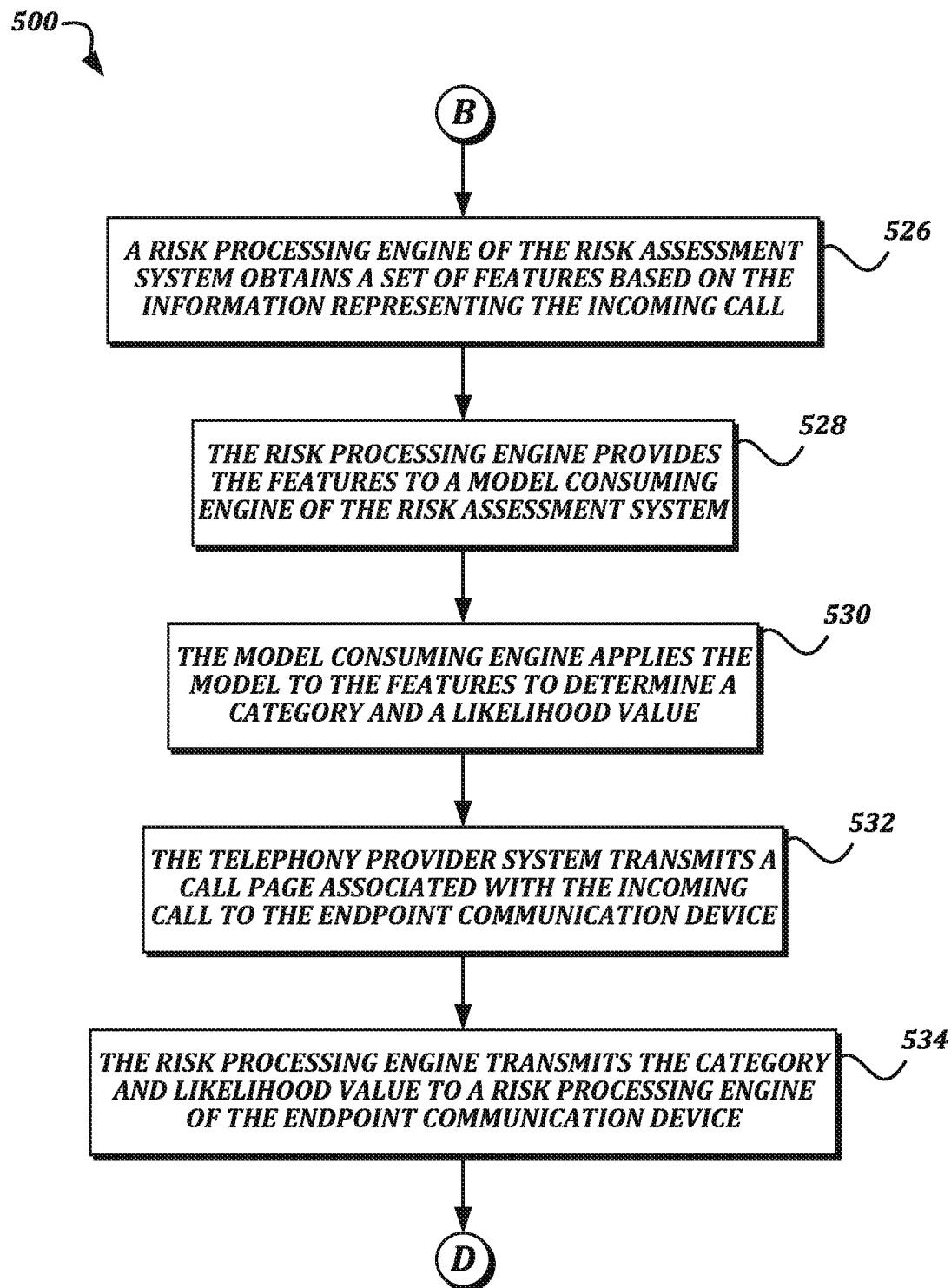
Figure 5C:
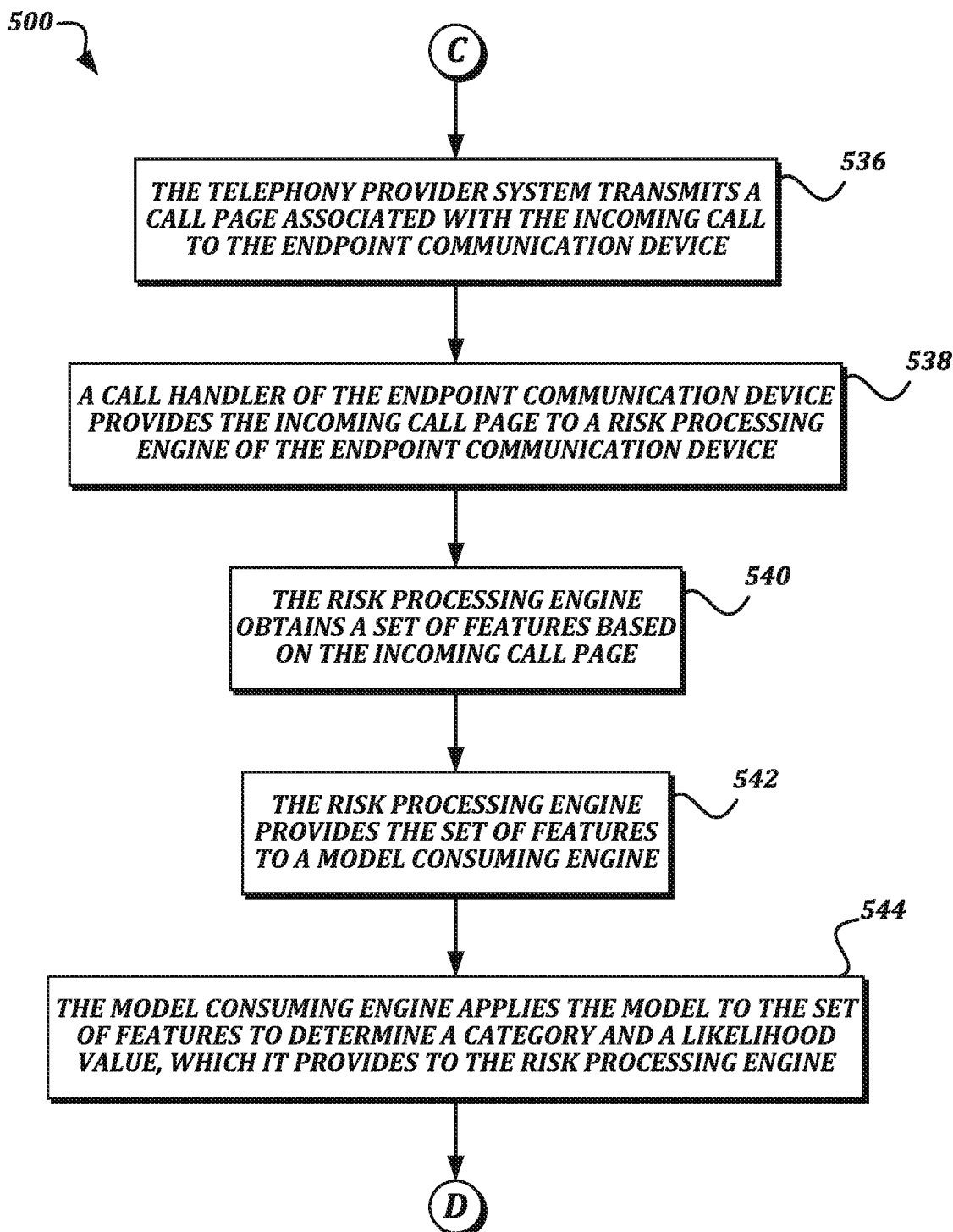
Figure 5D:
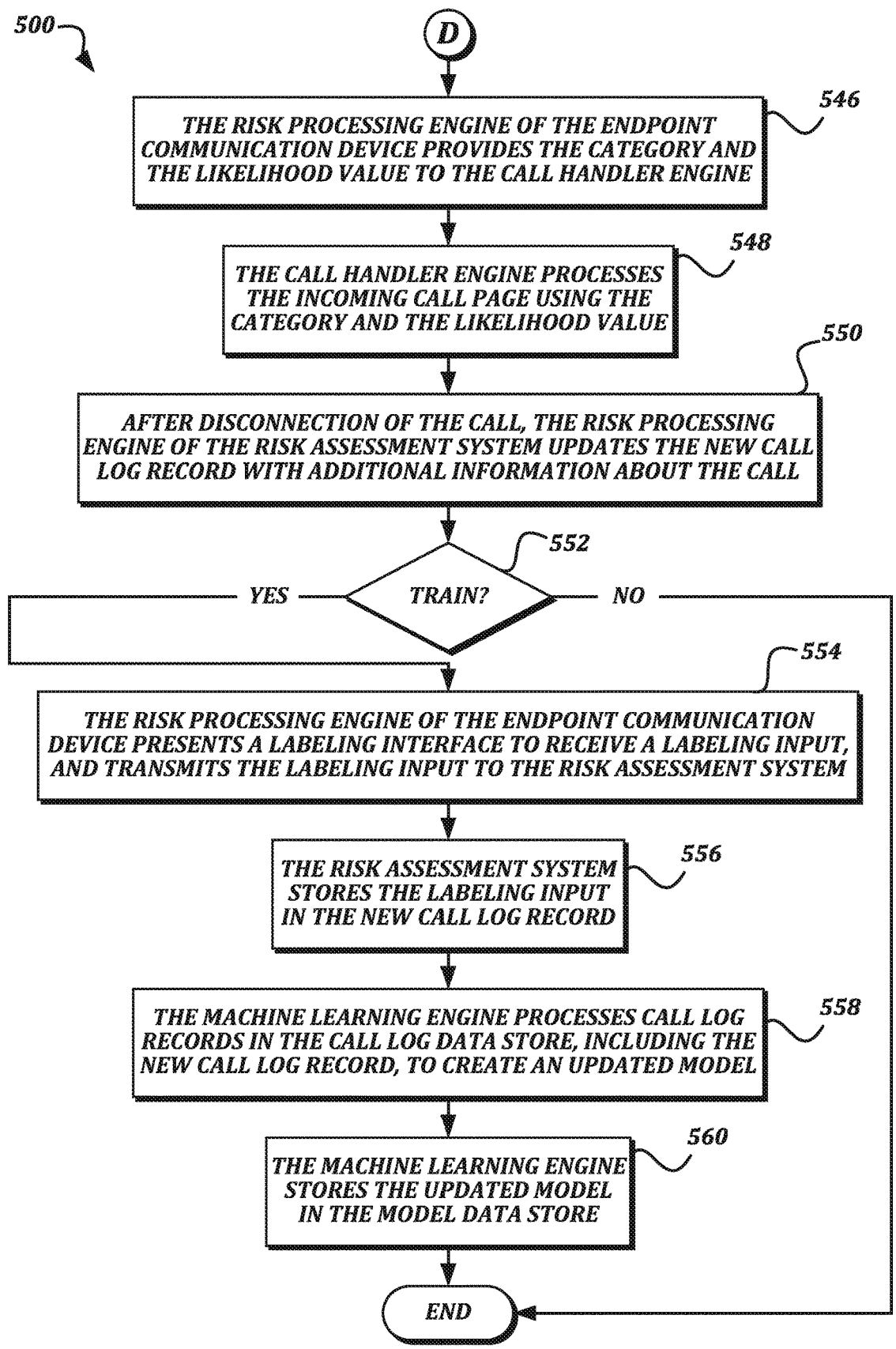

In some embodiments, the method 700 may proceed after block 714 to collect feedback from the user as described in FIG. 5D, but this has not been illustrated again in FIG. 7 for the sake of brevity. The method 700 then proceeds to an end block and terminates.

Figure 8:
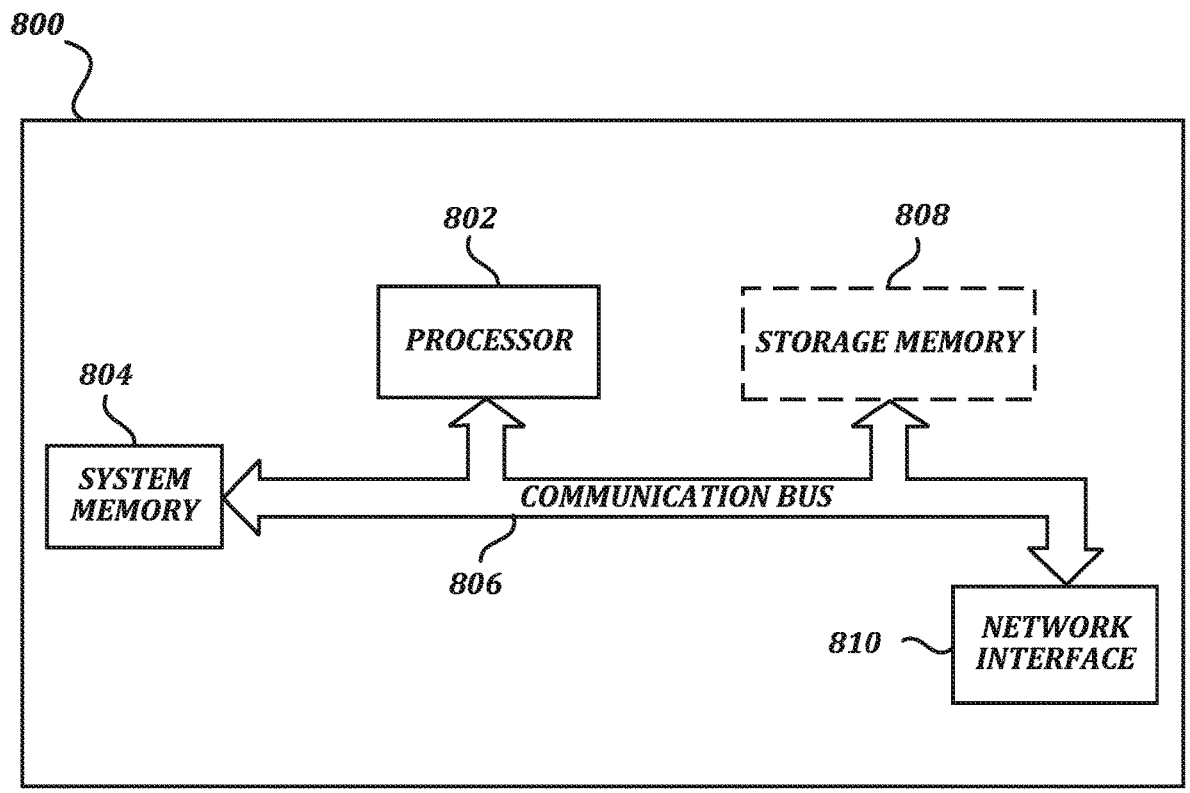
FIG. 8 is a block diagram that illustrates aspects of an exemplary computing device appropriate for use with embodiments of the present disclosure.

FIG. 8 is a block diagram that illustrates aspects of an exemplary computing device appropriate for use with embodiments of the present disclosure. While FIG. 8 is described with reference to a computing device that is implemented as a device on a network, the description below is applicable to servers, personal computers, mobile phones, smart phones, tablet computers, embedded computing devices, and other devices that may be used to implement portions of embodiments of the present disclosure. Moreover, those of ordinary skill in the art and others will recognize that the computing device 800 may be any one of any number of currently available or yet to be developed devices.

In its most basic configuration, the computing device 800 includes at least one processor 802 and a system memory 804 connected by a communication bus 806. Depending on the exact configuration and type of device, the system memory 804 may be volatile or nonvolatile memory, such as read only memory ("ROM"), random access memory ("RAM"), EEPROM, flash memory, or similar memory technology. Those of ordinary skill in the art and others will recognize that system memory 804 typically stores data and/or program modules that are immediately accessible to and/or currently being operated on by the processor 802. In this regard, the processor 802 may serve as a computational center of the computing device 800 by supporting the execution of instructions.

As further illustrated in FIG. 8, the computing device 800 may include a network interface 810 comprising one or more components for communicating with other devices over a network. Embodiments of the present disclosure may access basic services that utilize the network interface 810 to perform communications using common network protocols. The network interface 810 may also include a wireless network interface configured to communicate via one or more wireless communication protocols, such as WiFi, 2G, 3G, LTE, WiMAX, Bluetooth, and/or the like.

In the exemplary embodiment depicted in FIG. 8, the computing device 800 also includes a storage medium 808. However, services may be accessed using a computing device that does not include means for persisting data to a local storage medium. Therefore, the storage medium 808 depicted in FIG. 8 is represented with a dashed line to indicate that the storage medium 808 is optional. In any event, the storage medium 808 may be volatile or nonvolatile, removable or nonremovable, implemented using any technology capable of storing information such as, but not limited to, a hard drive, solid state drive, CD-ROM, DVD, or other disk storage, magnetic cassettes, magnetic tape, magnetic disk storage, and/or the like.

As used herein, the term "computer-readable medium" includes volatile and nonvolatile and removable and non-removable media implemented in any method or technology capable of storing information, such as computer-readable instructions, data structures, program modules, or other data. In this regard, the system memory 804 and storage medium 808 depicted in FIG. 8 are merely examples of computer-readable media.

Suitable implementations of computing devices that include a processor 802, system memory 804, communication bus 806, storage medium 808, and network interface 810 are known and commercially available. For ease of illustration and because it is not important for an understanding of the claimed subject matter, FIG. 8 does not show some of the typical components of many computing devices. In this regard, the computing device 800 may include input devices, such as a keyboard, keypad, mouse, microphone, touch input device, touch screen, tablet, and/or the like. Such input devices may be coupled to the computing device 800 by wired or wireless connections including RF, infrared, serial, parallel, Bluetooth, USB, or other suitable connections protocols using wireless or physical connections. Similarly, the computing device 800 may also include output devices such as a display, speakers, printer, etc. Since these devices are well known in the art, they are not illustrated or described further herein. Unless specifically defined herein, all terms used herein have the same meaning as they would to one skilled in the art of the present disclosure.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method of automatically conducting risk assessments for telephony communications, the method comprising:
   generating, by a risk assessment system, a model for assessing risk of incoming calls based on a set of call log records;
   receiving, by the risk assessment system, information representing an incoming call directed to an endpoint communication device via a telephony provider system;
   processing, by the risk assessment system, the information representing the incoming call using the model to determine a category and a likelihood value for the incoming call; and
   providing the category and the likelihood value to the telephony provider system for transmission to the endpoint communication device.

2. The method of claim 1, wherein generating the model for assessing risk of incoming calls based on a set of call log records includes using a set of call log records to train a naïve Bayes classifier or a decision tree.

3. The method of claim 1, further comprising receiving, by the risk assessment system from the endpoint communication device, feedback regarding the incoming call.

4. The method of claim 3, further comprising storing the feedback along with information from the incoming call page in a new call log record.

5. The method of claim 4, further comprising generating a new model for assessing risk of incoming calls based in part on the new call log record.

6. The method of claim 1, further comprising collecting further information to augment call log records before generating the model.

7. The method of claim 6, wherein the further information includes at least one of an outbound traffic characteristic, an inbound traffic characteristic, a number of complaints, a port history characteristic, a traffic characteristic, and a transaction statistic.

8. A risk assessment system configured to automatically conduct risk assessments for telephony communications, by:
   generating, by the risk assessment system, a model for assessing risk of incoming calls based on a set of call log records;
   receiving, by the risk assessment system, information representing an incoming call directed to an endpoint communication device via a telephony provider system;
   processing, by the risk assessment system, the information representing the incoming call using the model to determine a category and a likelihood value for the incoming call; and
   providing the category and the likelihood value to the telephony provider system for transmission to the endpoint communication device.

9. The risk assessment system of claim 8, wherein generating the model for assessing risk of incoming calls based on a set of call log records includes using a set of call log records to train a naïve Bayes classifier or a decision tree.

10. The risk assessment system of claim 8, further configured to receive, from the endpoint communication device, feedback regarding the incoming call.

11. The risk assessment system of claim 10, further configured to store the feedback along with information from the incoming call page in a new call log record.

12. The risk assessment system of claim 11, further configured to generate a new model for assessing risk of incoming calls based in part on the new call log record.

13. The risk assessment system of claim 8, further configured to collect further information to augment call log records before generating the model.

14. The risk assessment system of claim 13, wherein the further information includes at least one of an outbound traffic characteristic, an inbound traffic characteristic, a number of complaints, a port history characteristic, a traffic characteristic, and a transaction statistic.

* * * * *